US012092531B2

United States Patent
Klennert et al.

(10) Patent No.: US 12,092,531 B2
(45) Date of Patent: Sep. 17, 2024

(54) OSCILLATING HEAT PIPE BASED ENERGY BEAM PROFILER AND CALORIMETER

(71) Applicant: The Boeing Company, Chicago, IL (US)

(72) Inventors: Wade Lawrence Klennert, Albuquerque, NM (US); Ralph Russell Galetti, Albuquerque, NM (US)

(73) Assignee: The Boeing Company, Chicago, IL (US)

( * ) Notice: Subject to any disclaimer, the term of this patent is extended or adjusted under 35 U.S.C. 154(b) by 571 days.

(21) Appl. No.: 17/372,067

(22) Filed: Jul. 9, 2021

(65) Prior Publication Data

US 2022/0090971 A1 Mar. 24, 2022

Related U.S. Application Data

(60) Provisional application No. 63/080,628, filed on Sep. 18, 2020.

(51) Int. Cl.
*G01K 17/00* (2006.01)
*G01K 1/16* (2006.01)
*G01K 5/04* (2006.01)

(52) U.S. Cl.
CPC ............. *G01K 17/003* (2013.01); *G01K 1/16* (2013.01); *G01K 5/04* (2013.01)

(58) Field of Classification Search
CPC ........... G01K 17/003; G01K 1/16; G01K 5/04
See application file for complete search history.

(56) References Cited

U.S. PATENT DOCUMENTS

| 4,596,461 A * | 6/1986 | DeRosa | G01K 17/003 374/E17.002 |
| 4,797,555 A * | 1/1989 | La Mar | G01J 1/4257 374/161 |
| 8,711,342 B2 * | 4/2014 | Elliott | G01N 21/171 600/407 |
| 2005/0111519 A1 * | 5/2005 | Eigler | G01K 17/00 374/31 |
| 2010/0040106 A1 * | 2/2010 | Sakami | G01N 25/66 702/50 |
| 2011/0206077 A1 * | 8/2011 | Schlie | H01S 3/0604 372/35 |

(Continued)

OTHER PUBLICATIONS

James R. Luke et al., "High Energy Laser Diagnostic Sensors," AIP Conference Proceedings 1278 (2010), https://doi.org/10.1063/1.3507182, 2 pages.

(Continued)

*Primary Examiner* — Nathaniel T Woodward
*Assistant Examiner* — Philip L Cotey
(74) *Attorney, Agent, or Firm* — Haynes and Boone, LLP

(57) ABSTRACT

An energy beam profiler and calorimeter (EPC) is disclosed. The EPC includes a target board having a front surface and a back surface, a first plurality of oscillating heat pipes arranged as columns on a first plate, and a second plurality of oscillating heat pipes arranged as rows on a second plate. The target board is configured to receive an impinging energy beam at the front surface of the target board, and the first plate and second plate are adjacent to and in thermal communication with the back surface of the target board.

24 Claims, 15 Drawing Sheets

(56) References Cited

U.S. PATENT DOCUMENTS

| | | | | |
|---|---|---|---|---|
| 2012/0002193 A1* | 1/2012 | Elliott | ............... | G01K 17/003 |
| | | | | 356/121 |
| 2013/0133871 A1* | 5/2013 | Ma | ............... | H01L 23/427 |
| | | | | 165/185 |
| 2016/0141825 A1* | 5/2016 | Klennert | ............ | H01S 5/02469 |
| | | | | 372/34 |
| 2016/0334285 A1* | 11/2016 | Celikel | ............... | G01J 1/0418 |
| 2020/0398385 A1* | 12/2020 | Alahyari | ............... | B23P 15/26 |

OTHER PUBLICATIONS

John Wallace, "Laser beam diagnostics: Beam analysis tools each have their own approach," Sep. 16, 2015, 15 pages.

John Le Sage, "Beam Irradiance on Target Systems (BITS)," Jun. 1, 2013, 3 pages.

* cited by examiner

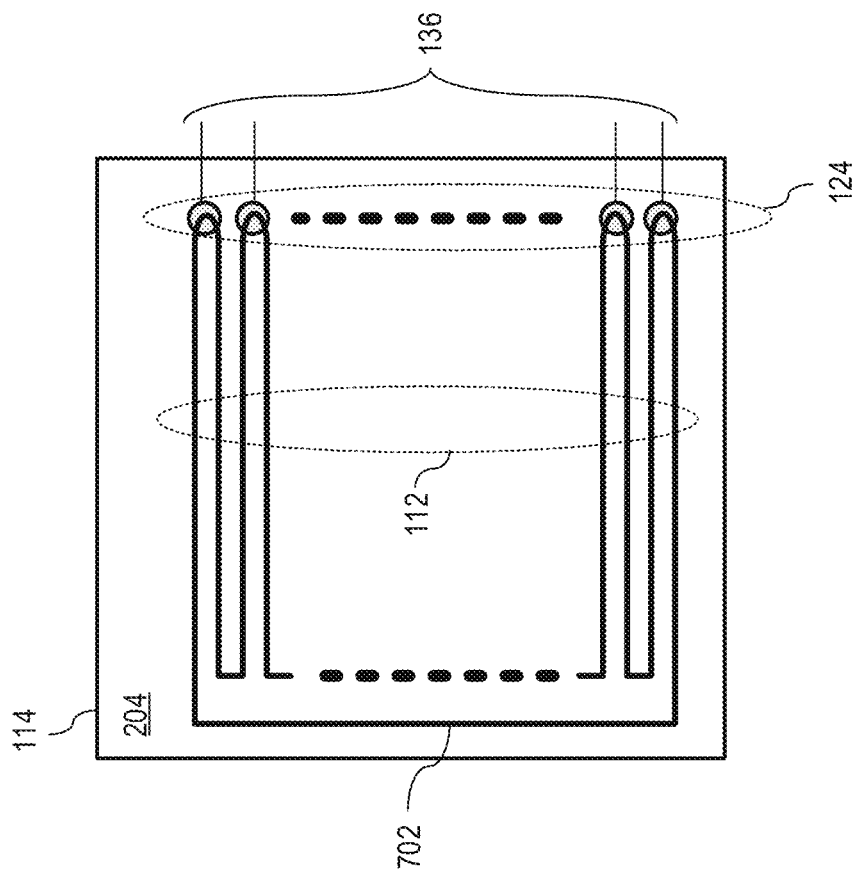
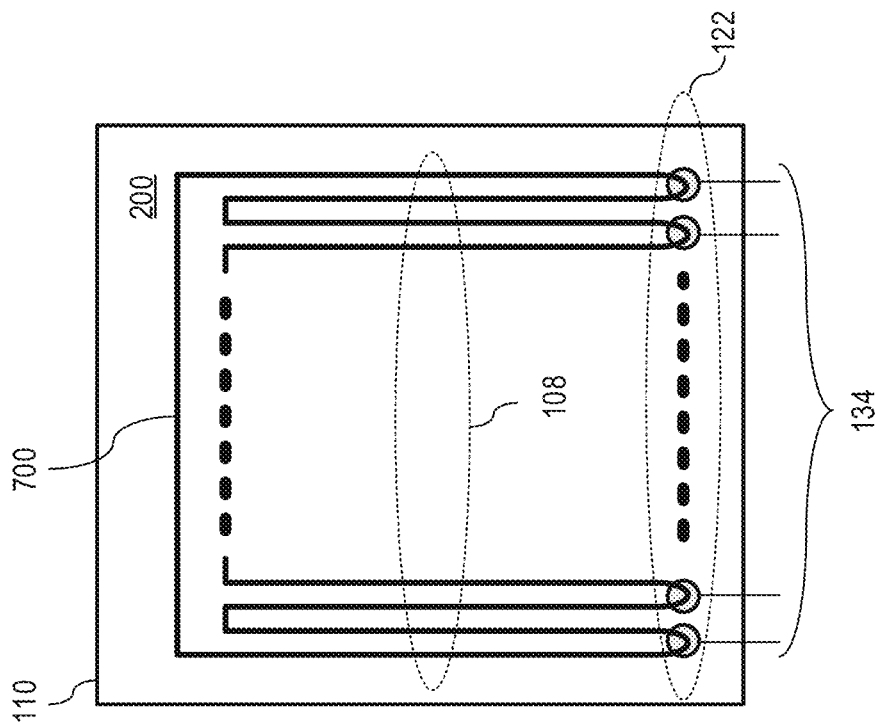
FIG. 7B
FIG. 7A

OSCILLATING HEAT PIPE BASED ENERGY BEAM PROFILER AND CALORIMETER

CROSS REFERENCE TO RELATED APPLICATION

The present invention claims priority to U.S. Provisional Application No. 63/080,628 filed Sep. 18, 2020, which is incorporated herein by reference in its entirety.

BACKGROUND

1. Technical Field

The field of the present disclosure relates generally to energy beam systems, and more specifically, to test systems for measuring characteristics of an energy beam.

2. Prior Art

Existing, commercially available systems that measure high-energy energy/laser beam profiles are relatively large, power intensive, have low damage thresholds, and require longer measurement times than what is needed for the beam dynamics typically tested on modern high-energy laser systems under field test conditions. These systems are typically limited in the overall area that can be implemented as a target board size. Therefore, there is a need for a system and method that addresses some of these problems, and others.

SUMMARY

Disclosed is an energy beam profiler and calorimeter (EPC). The EPC comprises a target board having a front surface and a back surface, a first plurality of oscillating heat pipes arranged as columns on a first plate, and a second plurality of oscillating heat pipes arranged as rows on a second plate. The target board is configured to receive an impinging energy beam at the front surface of the target board, and the first plate and second plate are adjacent to and in thermal communication with the back surface of the target board.

Also disclosed is another EPC that comprises the target board having the front surface and the back surface, a first plurality of oscillating heat pipes arranged as columns on a middle plate, and a second plurality of oscillating heat pipes arranged as rows on the middle plate. The target board is configured to receive the impinging energy beam at the front surface of the target board, and the middle plate is adjacent to and in thermal communication with the back surface of the target board.

In examples of operation, the both EPC configurations perform a method for measuring the calorimetry and beam profile of the energy beam. The method includes receiving the impinging energy beam at the target point of the front surface of the target board, where the impinging energy beam produces heat at the front surface at the target point, and conducting, as a conducted heat, the heat at the target point from the front surface to a back surface of the target board. The method also includes transferring the conducted heat to the first plurality of oscillating heat pipes arranged as columns and the second plurality of oscillating heat pipes arranged as rows. The method further includes measuring a plurality of temperatures of the columns with a plurality of column probes, measuring a plurality of temperatures of the rows with a plurality of row probes, and determining the calorimetry and beam profile of the energy beam.

Other devices, apparatuses, systems, methods, features, and advantages of the invention will be or will become apparent to one with skill in the art upon examination of the following figures and detailed description. It is intended that all such additional devices, apparatuses, systems, methods, features, and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

FIG. 7A is a front view of a system diagram of an example of an implementation of oscillating heat pipe on a first plate for use with the EPC of FIG. 1 in accordance with the present disclosure.

FIG. 7B is a front view of a system diagram of an example of an implementation of oscillating heat pipe on a second plate for use with the EPC of FIG. 1 in accordance with the present disclosure.

DETAILED DESCRIPTION

An energy beam profiler and calorimeter (EPC) is disclosed. The EPC includes a target board having a front surface and a back surface, a first plurality of oscillating heat pipes arranged as columns on a first plate, and a second plurality of oscillating heat pipes arranged as rows on a second plate. The target board is configured to receive an impinging energy beam at the front surface of the target board, and the first plate and second plate are adjacent to and in thermal communication with the back surface of the target board. In this disclosure, the energy beam may be a directed-energy beam such as, for example, a laser, microwave beam, or particle beam.

Also disclosed is another EPC that comprises the target board having the front surface and the back surface, a first plurality of oscillating heat pipes arranged as columns on a middle plate, and a second plurality of oscillating heat pipes arranged as rows on the middle plate. The target board is configured to receive the impinging energy beam at the front surface of the target board, and the middle plate is adjacent to and in thermal communication with the back surface of the target board.

In examples of operation, the both EPC configurations perform a method for measuring the calorimetry and beam profile of the energy beam. The method includes receiving the impinging energy beam at the target point of the front surface of the target board, where the impinging energy beam produces heat at the front surface at the target point, and conducting, as a conducted heat, the heat at the target point from the front surface to a back surface of the target board. The method also includes transferring the conducted heat to the first plurality of oscillating heat pipes arranged as columns and the second plurality of oscillating heat pipes arranged as rows. The method further includes measuring a plurality of temperatures of the columns with a plurality of column probes, measuring a plurality of temperatures of the rows with a plurality of row probes, and determining the calorimetry and beam profile of the energy beam.

The EPC and method allows test personnel to accurately, with a high spatial resolution, high measurement frequency, and low measurement latency, measure high-energy energy beam profile energy deposited on a target point on the surface of the target board where the surface of the target board may be planar or non-planar. In this disclosure, the use of oscillating heat pipes allows for the near instantaneous transfer of heat energy from the impinging energy beam on the target point to the measurement of changes in temperature at the plurality of column probes and plurality of row probes, allowing for measurement of a rapidly changing beam profile and calorimetry of energy beam.

Figure 1:
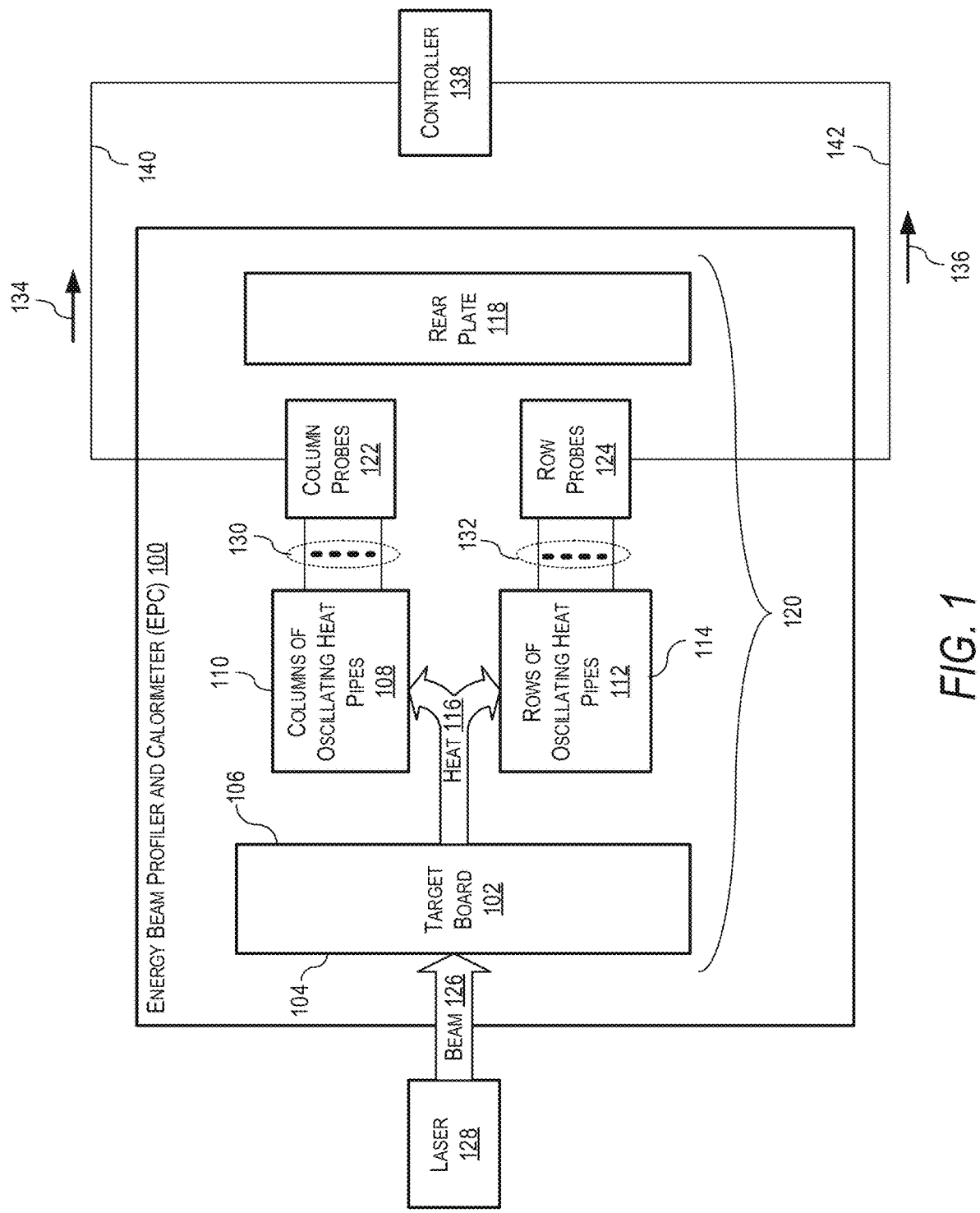
FIG. 1 is a system block diagram of an example of an implementation of an energy beam profiler and calorimeter (EPC) in accordance with the present disclosure.

In FIG. 1, a system block diagram is shown of an example of an implementation of an energy beam profiler and calorimeter (EPC) 100 in accordance with the present disclosure. The EPC 100 includes a target board 102 having a front surface 104 and a back surface 106, a first plurality of oscillating heat pipes 108 arranged as columns on a first plate 110, and a second plurality of oscillating heat pipes 112 arranged as rows on a second plate 114. The first plate 110 and second plate 114 are adjacent to and in thermal communication with the back surface 106 of the target board 102 and are configured to receive conducted heat 116 from the back surface 106 of the target board 102. The EPC 100 may also include a rear plate 118 adjacent to the first plate 110 and the second plate 114, and the EPC 100 may form a sandwich type stack-up 120 that includes the target board 102, the first plate 110, second plate 114 and rear plate 118. The EPC 100 may also include a plurality of column probes 122 and a plurality of row probes 124. In this example, each column probe of the plurality of column probes 122 is in thermal communication with an individual oscillating heat pipe of the first plurality of oscillating heat pipes 108. Similarly, in this example, each row probe of the plurality of row probes 124 is in thermal communication with an individual oscillating heat pipe of the second plurality of oscillating heat pipes 112. In another example, a single probe may be utilized with two oscillating heat pipes to form two oscillating heat pipe channels.

The target board 102 is configured to receive an energy beam 126 from an energy source 128 at the front surface 104 of the target board 102 and produce the conducted heat 116 from energy of the energy beam 126 that is thermally conducted from the back surface 106 of the target board 102 to the first plurality of oscillating heat pipes 108 and second plurality of oscillating heat pipes 112. The first plurality of oscillating heat pipes 108 and second plurality of oscillating heat pipes 112 are configured to receive the conducted heat 116 and transfer the received conducted heat 116 to the plurality of column probes 122 and plurality of row probes 124, respectively, via a first plurality of individual oscillating heat pipes 130 organized into individual columns and second plurality of individual oscillating heat pipes 132 organized into individual rows. The plurality of column probes 122 and plurality of row probes 124 are then configured to produce a first plurality of probe signals 134 and second plurality of probe signals 136 that may be transmitted to a controller 138 external to the EPC 100 that is in signal communication with the EPC 100 via signal paths 140 and 142, respectively.

It is appreciated by those of ordinary skill in the art that the circuits, components, modules, and/or devices of, or associated with, the EPC 100 are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats, without passing through a direct electromagnetic connection.

Figure 2:
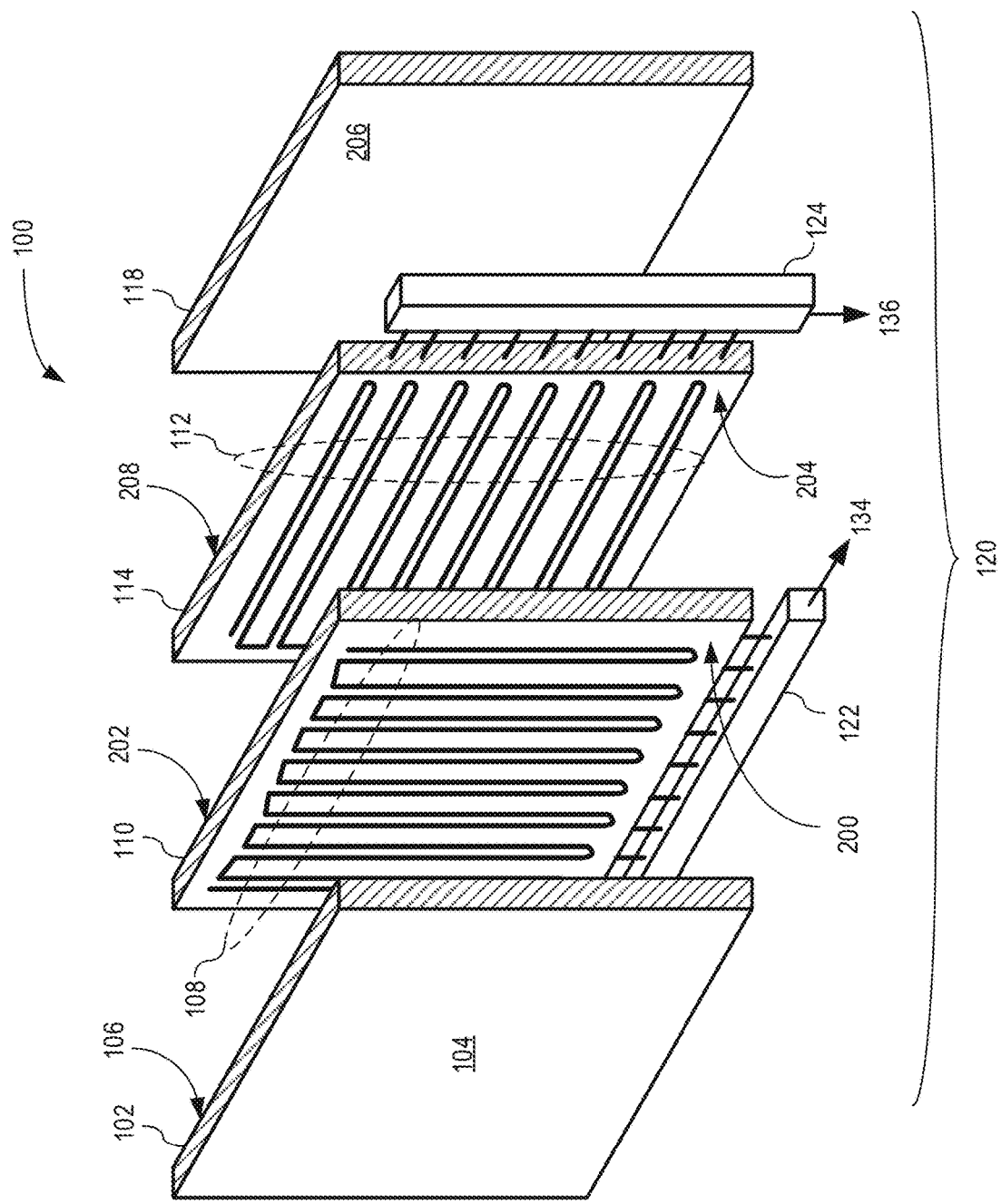
FIG. 2 is an exploded perspective view of the sandwich type stack-up of the EPC shown in FIG. 1 in accordance with the present disclosure.

In FIG. 2, an exploded perspective view of the sandwich type stack-up 120 of the EPC 100 is shown in accordance with the present disclosure. In this example, the first plate 110 is shown adjacent to and in physical contact with the back surface 106 of the target board 102, where a front surface 200 of the first plate 110 is adjacent to and in physical contact with the back surface 106 of the target board 102. The first plate 110 also includes a back surface 202 that is adjacent to and in physical contact with a front surface 204 of the second plate 114. The rear plate 118 includes a front surface 206 that is adjacent to and in physical contact with a back surface 208 of the second plate 114. In this example, the back surface 106 of the target board 102 is in thermal communication with both the front surface 200 of the first plate 110 and front surface 204 of the second plate 114, where the first plurality of oscillating heat pipes 108 are located on the front surface 200 of the first plate 110 and the second plurality of oscillating heat pipes 112 are located on the front surface 204 of the second plate 114. Furthermore, in this example, the first plurality of oscillating heat pipes 108 are arranged as columns of individual oscillating heat pipes along the front surface 200 of the first plate 110 and the second plurality of oscillating heat pipes 112 are arranged as rows of individual oscillating heat pipes along the front surface 204 of the second plate 114. The rows of the first plurality of oscillating heat pipes 108 are approximately orthogonal to the columns of the second plurality of oscillating heat pipes 112. The rows of the second plurality of oscillating heat pipes 112 are in thermal communication with the plurality of row probes 124 and the columns of the first plurality of oscillating heat pipes 108 are in thermal communication with the plurality of column probes 122.

Alternatively, instead of the first plate 110, the second plate 114 may be adjacent to and in physical contact with the back surface 106 of the target board 102, where the front surface 204 of the second plate 114 is adjacent to and in physical contact with the back surface 106 of the target board 102. In this example, the front surface 200 of the first plate 110 is adjacent to and in physical contact with the back surface 208 of the second plate 114 and the front surface 206 of the rear plate 118 is adjacent to and in physical contact with the back surface 202 of the first plate 110. As discussed earlier, in this example, the back surface 106 of the target board 102 is in thermal communication with both the front surface 204 of the second plate 114 and front surface 200 of the first plate 110, where the first plurality of oscillating heat pipes 108 are located on the front surface 200 of the first plate 110 and the second plurality of oscillating heat pipes 112 are located on the front surface 204 of the second plate 114. Again, the first plurality of oscillating heat pipes 108 are arranged as columns of individual oscillating heat pipes along the front surface 200 of the first plate 110 and the second plurality of oscillating heat pipes 112 are arranged as rows of individual oscillating heat pipes along the front surface 204 of the second plate 114. The rows of the first plurality of oscillating heat pipes 108 are approximately orthogonal to the columns of the second plurality of oscillating heat pipes 112. The rows of the second plurality of oscillating heat pipes 112 are in thermal communication with the plurality of row probes 124 and the columns of the first plurality of oscillating heat pipes 108 are in thermal communication with the plurality of column probes 122.

Figure 3:
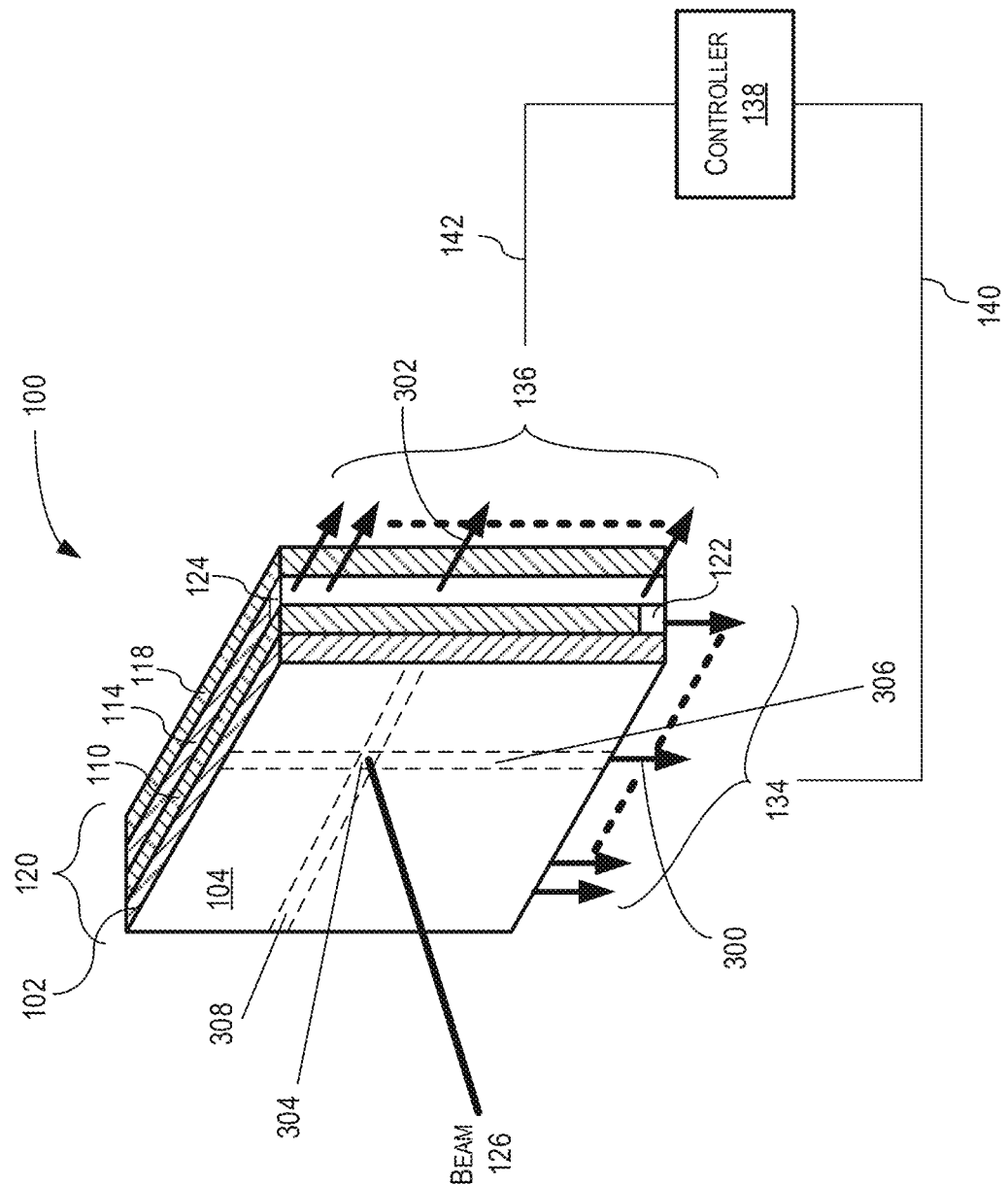
FIG. 3 is a perspective view of an example of an implementation of the EPC shown in FIGS. 1 and 2 in accordance with the present disclosure.

In FIG. 3, a perspective view of an example of an implementation of the EPC 100 is shown in accordance with the present disclosure. The EPC 100 is shown in signal communication with the controller 138 via the plurality of column probes 122 and plurality of row probes 124. As described earlier, in this example, the sandwich type stack-up 120 of the EPC 100 includes the target board 102, first plate 110, plurality of column probes 122, second plate 114, plurality of row probes 124, and rear plate 118.

In this example, the EPC 100 is configured to receive the energy beam 126 on the front surface 104 of the target board 102 and then transfer the conducted heat 116 to the plurality of column probes 122 and plurality of row probes 124 to produce a first column probe signal 300 and a first row probe signal 302. In an example of operation, the EPC 100 receives the impinging energy from the energy beam 126 on the target board 102 at a target point 304 along the front surface 104 of the target board 102. The conducted heat 116 is produced on the back surface 106 of the target board 102 by the impinging energy on the target point 304. The conducted heat 116 is thermally transferred to both the first plurality of oscillating heat pipes 108 and the second plurality of oscillating heat pipes 112. In this example, a first conducted heat pipe (of the first plurality of oscillating heat pipes 108) receives the conducted heat 116 and transfers it to a first column probe (of the plurality of column probes 122) along a first column 306 of the EPC 100. Similarly, a first conducted heat pipe (of the second plurality of oscillating heat pipes 112) receives the conducted heat 116 and transfers it to a first row probe (of the plurality of row probes 124) along a row 308 of the EPC 100. The first column probe produces first column probe signal 300 and the first row probe produces the first row probe signal 302, where the first column probe signal 300 is transmitted to the controller 138 with the first plurality of probe signals 134 via the signal path 140 and the first row probe signal 302 is transmitted to the controller 138 with the second plurality of probe signals 136 via the signal path 142.

The controller 138 is then a device or system configured to receive the first plurality of probe signals 134 and second plurality of probe signals 136 and, in response, determine a spatial intensity profile of the energy beam 126 at the target point 304, where the target point 304 is a particular plane that is transverse to the propagation path of the energy beam 126. In general, there are many types of energy beams such as lasers (i.e., energy source 128) that include, for example, ultraviolent, visible, infrared, continuous wave, pulsed, high-power, low-power, etc. The EPC 100 may be designed for use with these different types of energy beams sources such as lasers.

Since the EPC 100 transfers the conducted heat 116 to the individual column and row probes along individual oscillating heat pipes that correspond to individual columns and rows along the front surface 104 of the target board 102, the EPC 100 acts as an energy calorimeter because the resulting increase in temperature at the target point 304 caused by the impinging energy beam 126 can be measured when the conducted heat 116 produced at the back surface 106 of the target board 102 (which corresponds to the increase in temperature at the target point 304) is transferred to the column and row probes through the corresponding oscillating heat pipes.

In yet another alternative, the first plate 110 and second plate 114 may be combined or substituted by a single middle plate that includes both the first plurality of oscillating heat pipes and second plurality of oscillating heat pipes. Turning FIG. 4, a perspective view of an example of an implementation of another EPC 400 having a middle plate 402 is shown in accordance with the present disclosure.

In this example, similar to the example described in regard to FIGS. 1-3, the EPC 400 includes the target board 102 having the front surface 104 and the back surface 106 and the rear plate 118. As described earlier, the target board 102 is configured to receive the impinging energy beam 126 at the front surface 104 of the target board 102. The EPC 400 also includes a first plurality of oscillating heat pipes arranged as columns on a middle plate 402 and a second plurality of oscillating heat pipes arranged as rows on the middle plate 402. In this example, instead of including the first plate 110 and second plate 114, the EPC 400 includes the middle plate 402 in a sandwich type stack-up 404 between the target board 102 and the rear plate 118, where the middle plate 402 is adjacent to and in thermal communication with the back surface 106 of the target board 102. The rear plate 118 is adjacent to a back surface 406 of the middle plate 402. As described earlier, the rows of the second plurality of oscillating heat pipes are approximately orthogonal to the columns of the first plurality of oscillating heat pipes.

The EPC 400 also includes a plurality of column probes 408 in thermal communication with the first plurality of oscillating heat pipes and a plurality of row probes 410 in thermal communication with the second plurality of oscillating heat pipes. In this example, the first plurality of oscillating heat pipes is arranged as columns on a front surface 412 of the middle plate 402 and the second plurality of oscillating heat pipes is arranged as rows on the front surface 412 of the middle plate 402 below the first plurality of oscillating heat pipes. Alternatively, the second plurality of oscillating heat pipes may be arranged as rows on the front surface of the middle plate 402 above the first plurality of oscillating heat pipes.

As before, each oscillating heat pipe of the first plurality of oscillating heat pipes is a column channel and each column probe of the plurality of column probes 408 is a column temperature probe configured to measure a temperature of the column channel. Moreover, each oscillating heat pipe of the second plurality of oscillating heat pipes is a row channel and each row probe of the plurality of row probes 410 is a row temperature probe configured to measure a temperature of the row channel.

In this example, the EPC 400 is configured to receive the energy beam 126 on the front surface 104 of the target board 102 and then transfer the conducted heat 116 to the plurality of column probes 408 and plurality of row probes 410 to produce a first column probe signal 414 and a first row probe signal 416. Similar to the previous example, in an example of operation, the EPC 400 receives the impinging energy from the energy beam 126 on the target board 102 at the target point 418 along the front surface 104 of the target board 102. The conducted heat 116 is produced on the back surface 106 of the target board 102 by the impinging energy on the target point 418. The conducted heat 116 is thermally transferred to both the first plurality of oscillating heat pipes and the second plurality of oscillating heat pipes. In this example, a first oscillating heat pipe (of the first plurality of oscillating heat pipes) receives the conducted heat 116 and transfers it to a first column probe (of the plurality of column probes 408) along a first column 420 of the EPC 100. Similarly, a first oscillating heat pipe (of the second plurality of oscillating heat pipes) receives the conducted heat 116 and transfers it to a first row probe (of the plurality of row probes 410) along a row 422 of the EPC 400. The first column probe produces the first column probe signal 414 and the first row probe produces the first row probe signal 416, where the first column probe signal 414 is transmitted to the controller 138 with a first plurality of probe signals 424 via the signal path 140 and the first row probe signal 416 is transmitted to the controller 138 with a second plurality of probe signals 426 via the signal path 142.

Again, since the EPC 400 transfers the conducted heat 116 to the individual column and row probes along individual oscillating heat pipes that correspond to individual columns and rows along the front surface 104 of the target board 102, the EPC 400 acts as an energy calorimeter because the resulting increase in temperature at the target point 418 (caused by the impinging energy beam 126) can be measured when the conducted heat 116 produced at the back surface 106 of the target board 102 (which corresponds to the increase in temperature at the target point 418) is transferred to the column and row probes through the corresponding oscillating heat pipes.

In this disclosure, it is appreciated by those of ordinary skill in the art that an oscillating heat pipe (also generally known as a "pulsating heat pipe") is a thermally pumped, two phase device that is formed by a one or more meandering, hermetically sealed tube that crosses heating and cooling zones multiple times. Generally, the tube(s) is/are filled with a saturated two-phase mixture that, due to the tube diameter and fluid properties, forms a train of liquid "plugs" and "vapor bubbles." When heat is applied and absorbed by the fluid in the heat pipe(s), the resulting evaporation and condensation processes create pressure imbalances that, coupled with the random distribution of liquid plugs and vapor bubbles, generates motion of the two-phase mixture within the tube(s).

More specifically, an oscillating heat pipe is a passive heat transfer device that transports heat using two-phase fluid flow within capillary-sized tubes (i.e., pipes, tunnels sized such that they have a capillary effect on a working fluid disposed therein) which have a meandering, tortuous path traveling between areas of the device in thermal contact with one or more heat sources and one or more heat sinks or cooling zones. The volume of the tube pattern is partly filled with a working fluid and hermetically sealed from the outside environment. The tube's hydraulic diameter must be small enough and the surface tension of the working fluid great enough such that the fluid disperses itself throughout the tube interior area in discrete liquid plugs and vapor bubbles because of capillary action.

Figure 5:
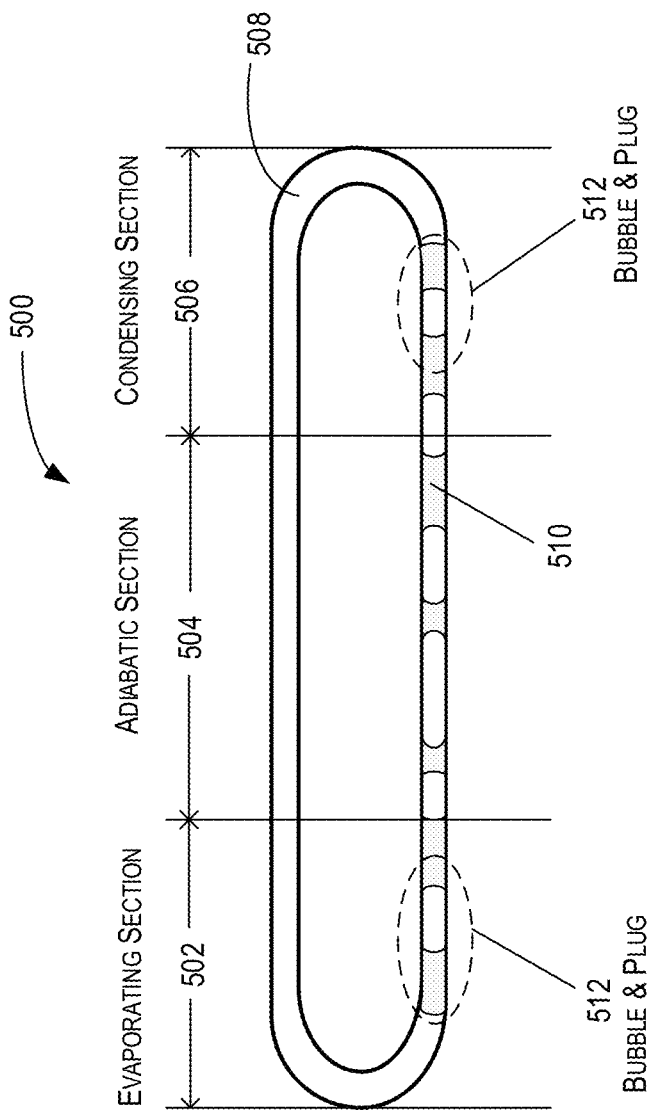
FIG. 5 is a system diagram of an example of an implementation of a single loop oscillating heat pipe in accordance with the present disclosure.

Turning to FIG. 5, a system diagram of an example of an implementation of a single loop oscillating heat pipe 500 is shown in accordance with the present disclosure. In this example, the basic concept and principle of the single loop oscillating heat pipe 500 is shown. The single loop oscillating heat pipe 500 includes an evaporating section 502, adiabatic section 504, and condensing section 506. The single loop oscillating heat pipe 500 uses capillary heat pipe action in a closed loop channel 508 filled with a working fluid 510 having plugs and vapor bubbles 512. In this example, the closed loop channel does not have any "wicks" like open loop heat pipes. In this example, a large "effective" thermal conductivity is created as a result of a unidirectional flow and the evaporation-condensation action (through the evaporating section 502, adiabatic section 504, and condensing section 506) of the working fluid 510. The resulting latent heat of vaporization is a thermal process known as the oscillating motion of the liquid plugs and vapor bubble 512. The pressure created during the working fluid 510 vaporization creates the oscillatory motion which has a frequency determined by the design of the single loop oscillating heat pipe 500. In this example, the working fluid 510 may be, for example, water, acetone and ammonia at room temperature, nitrogen for cryogenic operation and with alkali and other metal vapors at temperatures toward 100° Centigrade and higher. In general, the single loop oscillating heat pipe 500 utilizes the pressure change in volume expansion and contraction during phase change to excite the oscillation motion of the liquid plugs and vapor bubbles 512.

Properties of the single loop oscillating heat pipe 500 include: the single loop oscillating heat pipe 500 is an "active" cooling device, in that it converts intensive heat from the high-power generating device (such as energy beam 126) into kinetic energy of the working fluid 510 in support of the oscillating motion; liquid flow does not interfere with the vapor flow in high heat removal because both phases flow in the same direction; the thermally-driven oscillating flow inside the capillary tube (i.e., closed loop channel 508) will effectively produce some "blank" surfaces that significantly enhance evaporating and condensing heat transfer; and the oscillating motion in the closed loop channel 508 significantly enhances the forced convection in addition to the phase-change heat transfer.

Figure 6:
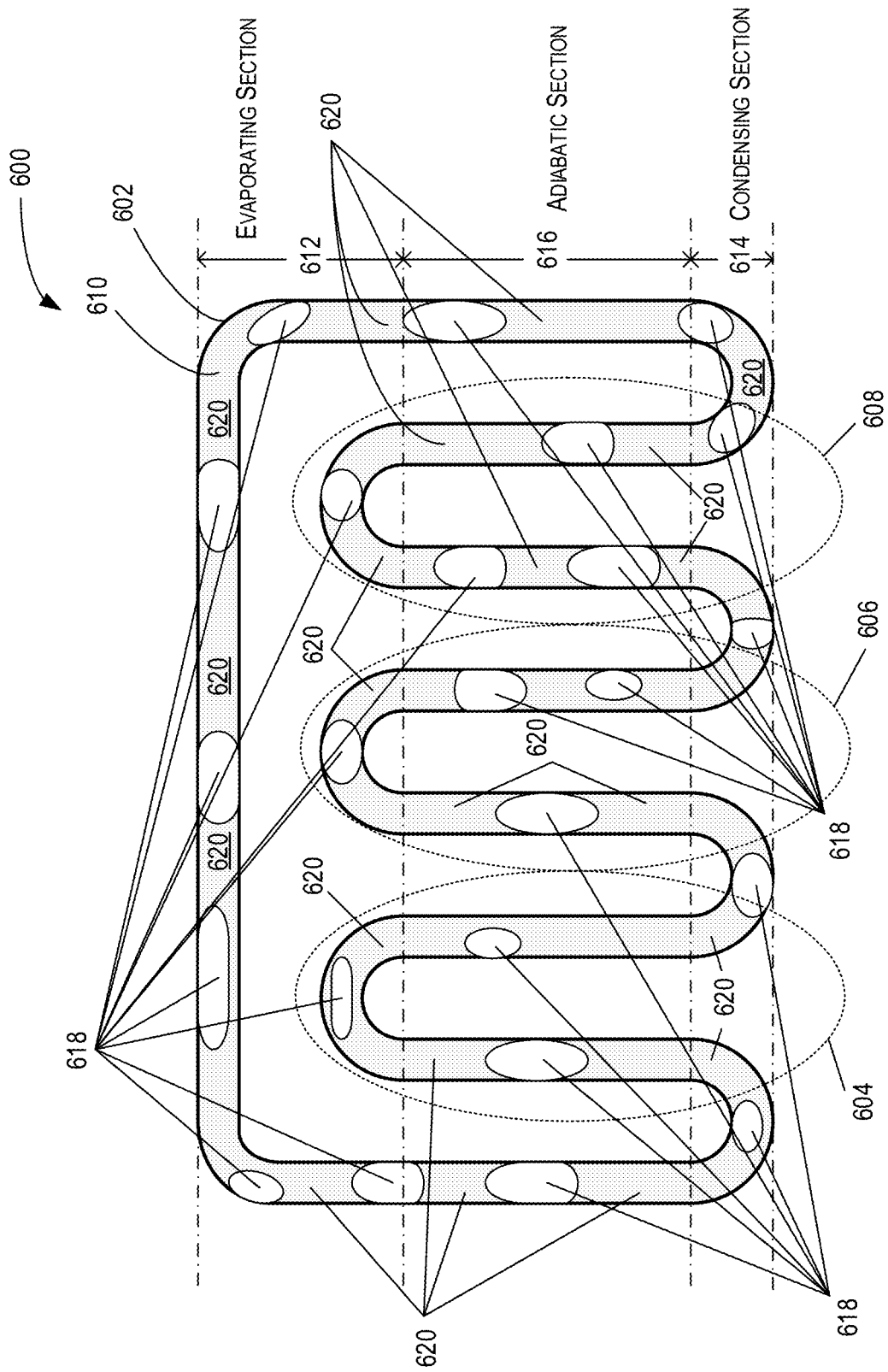
FIG. 6 is a system diagram of an example of an implementation of a multiple loop oscillating heat pipe having a meandering and serpentine pattern in accordance with the present disclosure.

For large heat transfer applications, the single loop oscillating heat pipe 500 does not typically provide enough heat transfer. As such, oscillating heat pipes for large heat transfer typically utilize multiple loops of the channel. In FIG. 6, a system diagram of an example of an implementation of a multiple loop oscillating heat pipe 600 having a meandering and/or serpentine pattern is shown in accordance with the present disclosure. In this example, the multiple loop oscillating heat pipe 600 is still a closed loop tube/channel 602 having a meandering pattern that includes, for example, a first oscillating heat pipe 604, a second oscillating heat pipe 606, and third oscillating heat pipe 608, where the first oscillating heat pipe 604, a second oscillating heat pipe 606, and third oscillating heat pipe 608 are serpentine portions of the multiple loop oscillating heat pipe 600. In an example of operation, the working fluid 610 oscillates back and forth through the multiple loop oscillating heat pipe 600 transferring heat energy from a evaporator section 612 to a condensing section 614 (through a adiabatic section 616) with an effective high thermal conductivity. This oscillation of the "bubbles" 618 within and "plugs" 620 of the working fluid 610 within the tube 602 and convective movement provides for significant heat transfer within the multiple loop oscillating heat pipe 600.

FIG. 7A is a front view of a system diagram of an example of an implementation of the oscillating heat pipe on the first plate 110 for use with the EPC 100 in accordance with the present disclosure. In this example, the first plurality of oscillating heat pipes 108 are shown to be part of a first multiple loop oscillating heat pipe 700. The plurality of column probes 122 are shown to be in physical contact and thermal communication with serpentine bends of each of the oscillating heat pipes of the first plurality of oscillating heat pipes 108. Similarly, in FIG. 7B, a front view of a system diagram of an example of an implementation of oscillating heat pipe on the second plate 114 for use with the EPC 100 is shown in accordance with the present disclosure. In this example, the second plurality of oscillating heat pipes 112 are shown to be part of a second multiple loop oscillating heat pipe 702. The plurality of column probes 122 are shown to be in physical contact and thermal communication with serpentine bends of each of the oscillating heat pipes of the first plurality of oscillating heat pipes 108 and the plurality of row probes 124 are shown to be in physical contact and thermal communication with serpentine bends of each of the oscillating heat pipes of the second plurality of oscillating heat pipes 112.

Figure 8:
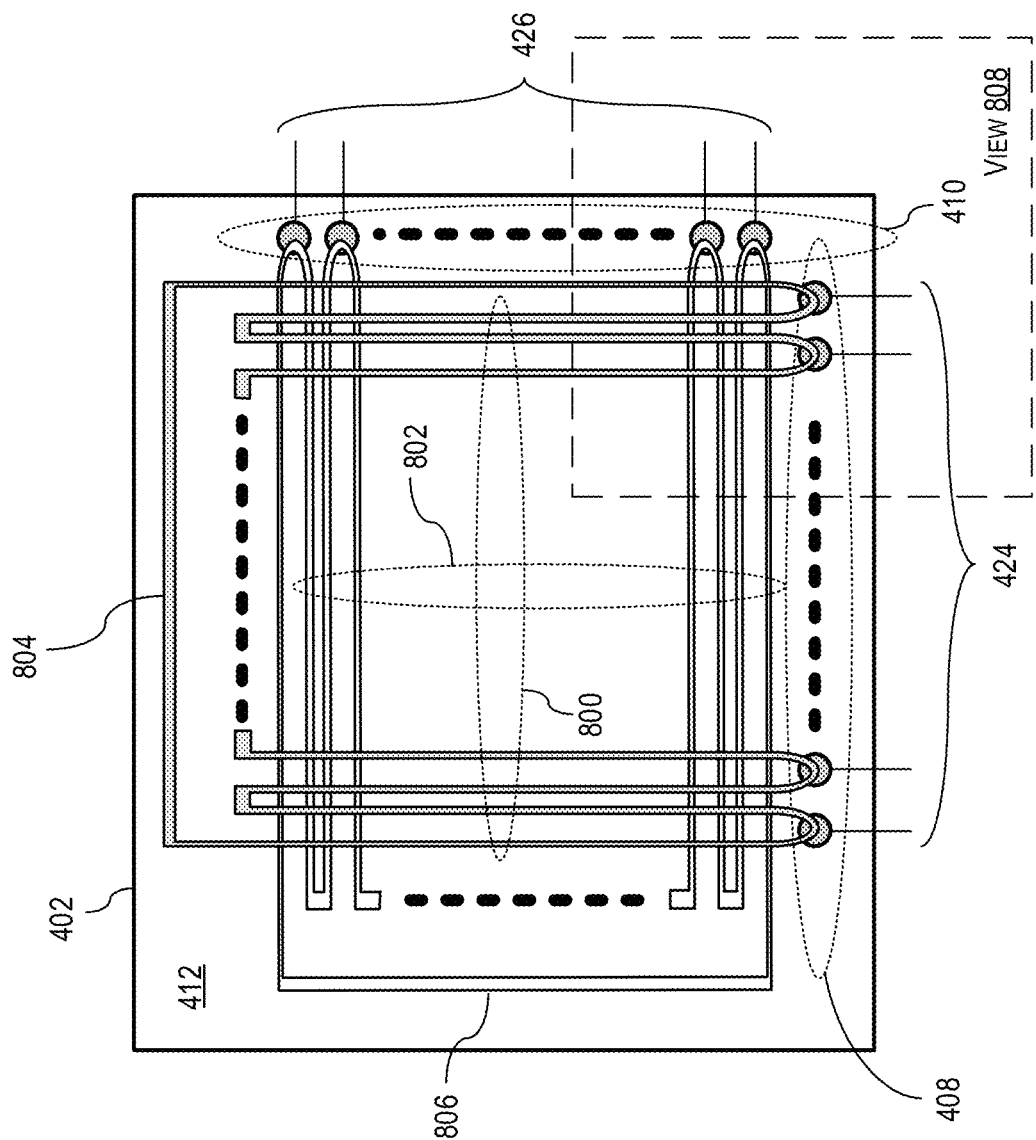
FIG. 8 is a front view of a system diagram of an example of an implementation of oscillating heat pipes on a middle plate for use with the EPC of FIG. 4 in accordance with the present disclosure.

Turning to FIG. 8, a front view of a system diagram of an example of an implementation of oscillating heat pipes on the middle plate 402 for use with the EPC 400 is shown in accordance with the present disclosure. The oscillating heat pipes include a first plurality of oscillating heat pipes 800 and a second plurality of oscillating heat pipes 802 that are oriented approximately orthogonal to the first plurality of oscillating heat pipes 800. In this example, the first plurality of oscillating heat pipes 800 located on the front surface 412 of the middle plate 402 above the second plurality of oscillating heat pipes 802. As described earlier, the first plurality of oscillating heat pipes 800 may alternatively be located on the front surface 412 of the middle plate 402 below the second plurality of oscillating heat pipes 802. In this example, the first plurality of oscillating heat pipes 800 are shown to be part of a first multiple loop oscillating heat pipe 804 and the second plurality of oscillating heat pipes 802 are shown to be part of a second multiple loop oscillating heat pipe 806. The plurality of column probes 408 are shown to be in physical contact and thermal communication with serpentine bends of each of the oscillating heat pipes of the first plurality of oscillating heat pipes 800 and the plurality of row probes 410 are shown to be in physical contact and thermal communication with serpentine bends of each of the oscillating heat pipes of the second plurality of oscillating heat pipes 802. In this example, each of the oscillating heat pipes of the first plurality of oscillating heat pipes 800 are arranged as columns on the front surface 412 of the middle plate 402 and the each of the oscillating heat pipes of the second plurality of oscillating heat pipes 802 are arranged as rows on the front surface 412 of the middle plate 402 either below or above the first plurality of oscillating heat pipes 800.

Figure 9:
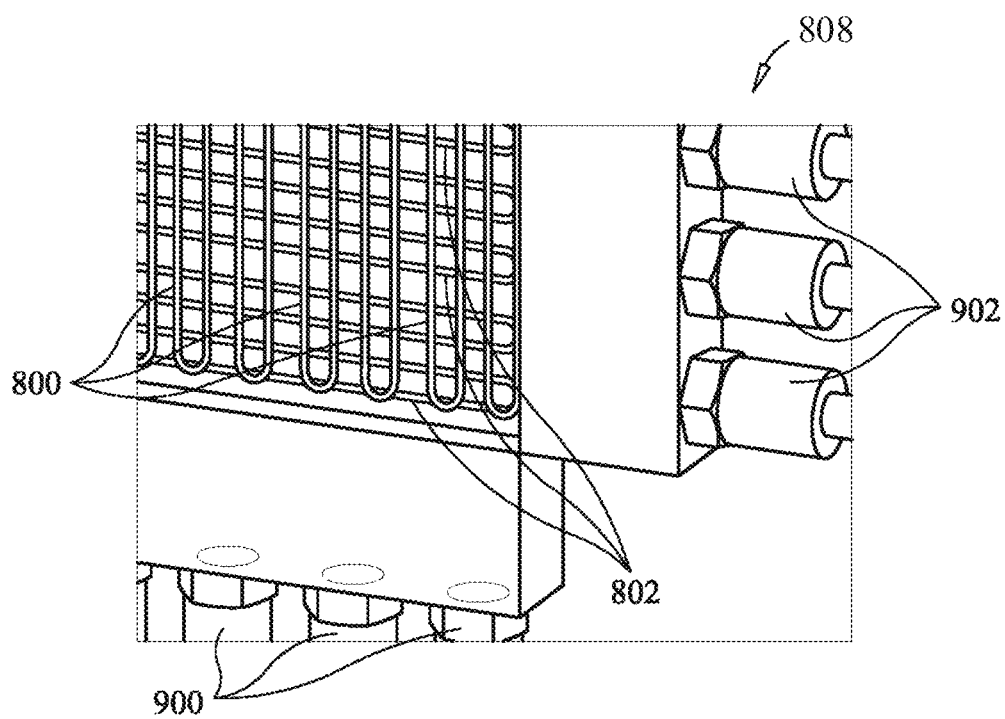
FIG. 9 is a partial front perspective view of an example of an implementation of oscillating heat pipes on the middle plate shown in FIGS. 4 and 8 in accordance with the present disclosure.

FIG. 9 is a partial front perspective view 808 of an example of an implementation of oscillating heat pipes on the middle plate 402 in accordance with the present disclosure. The partial front perspective view 808 shows an example of an implementation of the plurality of column probes 900 and plurality of row probes 902 along the middle plate 402. The first plurality of oscillating heat pipes 800 are arranged as vertical (i.e., columns) and the second plurality of oscillating heat pipes 802 are arranged as horizontal (i.e., rows).

Figure 10:
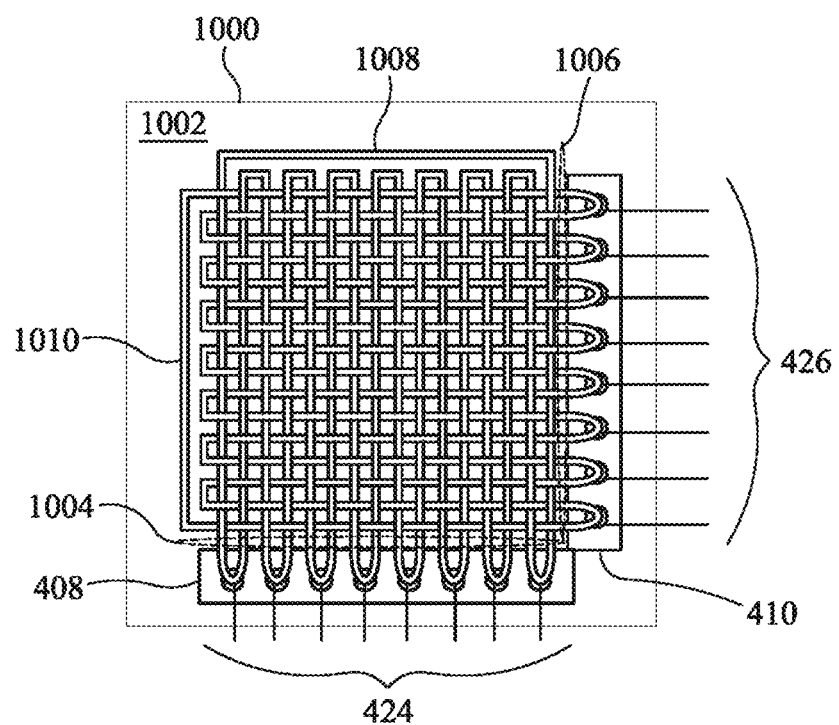
FIG. 10 is a front view of a system diagram of an example of another implementation of the oscillating heat pipes on a middle plate for use with the EPC of FIG. 4 in accordance with the present disclosure.

Turning to FIG. 10, a front view of a system diagram of an example of another implementation of oscillating heat pipes on a middle plate 1000 for use with the EPC is shown in accordance with the present disclosure. Similar to the example shown in relation to FIG. 8, in this example, the middle plate 1000 includes a front surface 1002 and the oscillating heat pipes include a first plurality of oscillating heat pipes 800 and a second plurality of oscillating heat pipes 802 that are oriented approximately orthogonal to the first plurality of oscillating heat pipes 800.

Additionally, the first plurality of oscillating heat pipes 1004 are shown to be part of a first multiple loop oscillating heat pipe 1008 and the second plurality of oscillating heat pipes 1006 are shown to be part of a second multiple loop oscillating heat pipe 1010. The plurality of column probes 408 are shown to be in physical contact and thermal communication with serpentine bends of each of the oscillating heat pipes of the first plurality of oscillating heat pipes 1004 and the plurality of row probes 410 are shown to be in physical contact and thermal communication with serpentine bends of each of the oscillating heat pipes of the second plurality of oscillating heat pipes 1006. In this example, each of the oscillating heat pipes of the first plurality of oscillating heat pipes 1004 are arranged as columns on the front surface 1002 of the middle plate 1000 and the each of the oscillating heat pipes of the second plurality of oscillating heat pipes 1006 are arranged as rows on the front surface 1002 of the middle plate 1000. Unlike the example described with regard to FIG. 8, in this example, the first plurality of oscillating heat pipes 1004 and a second plurality of oscillating heat pipes 1006 are interleaved on the front surface 1002 of the middle plate 1000.

Figure 11B:
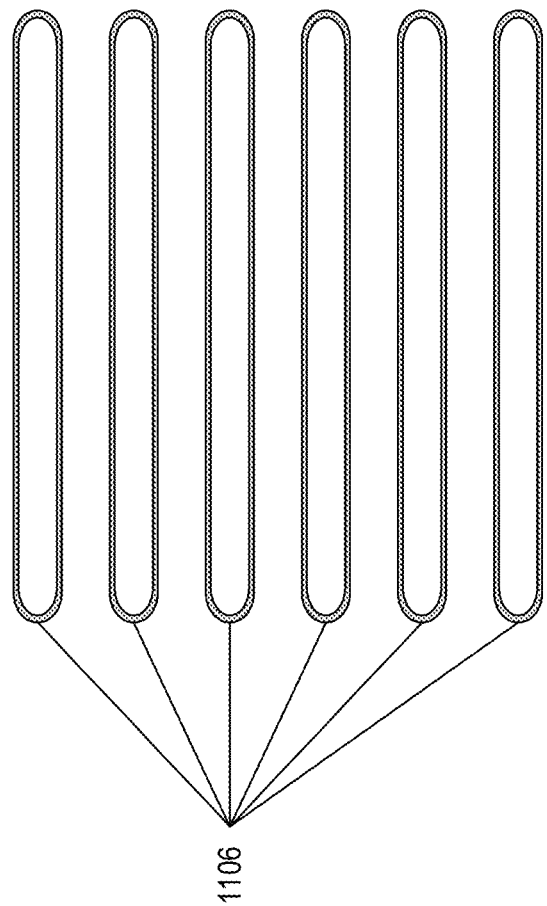
FIG. 11A-C are front views of a system diagram of an example of yet another implementation of oscillating heat pipes on a middle plate for use with the EPC of FIG. 4 in accordance with the present disclosure.
Figure 11A:
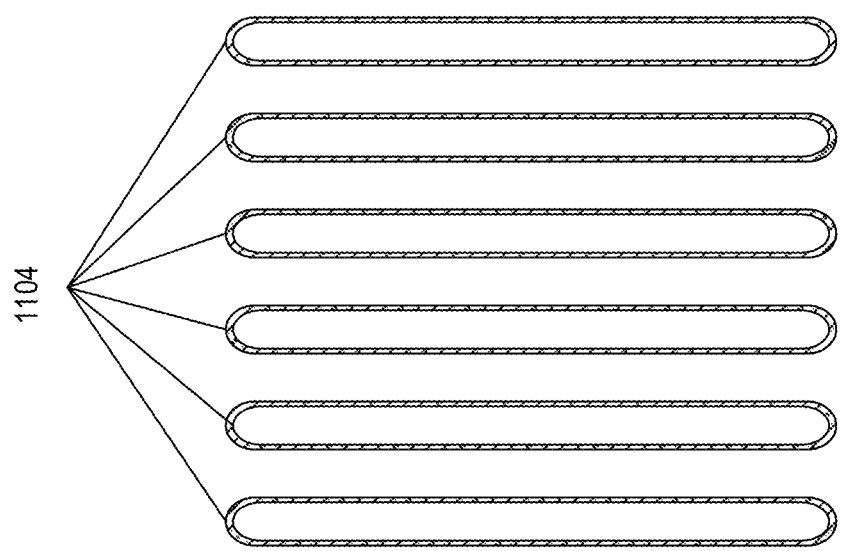
Figure 11C:
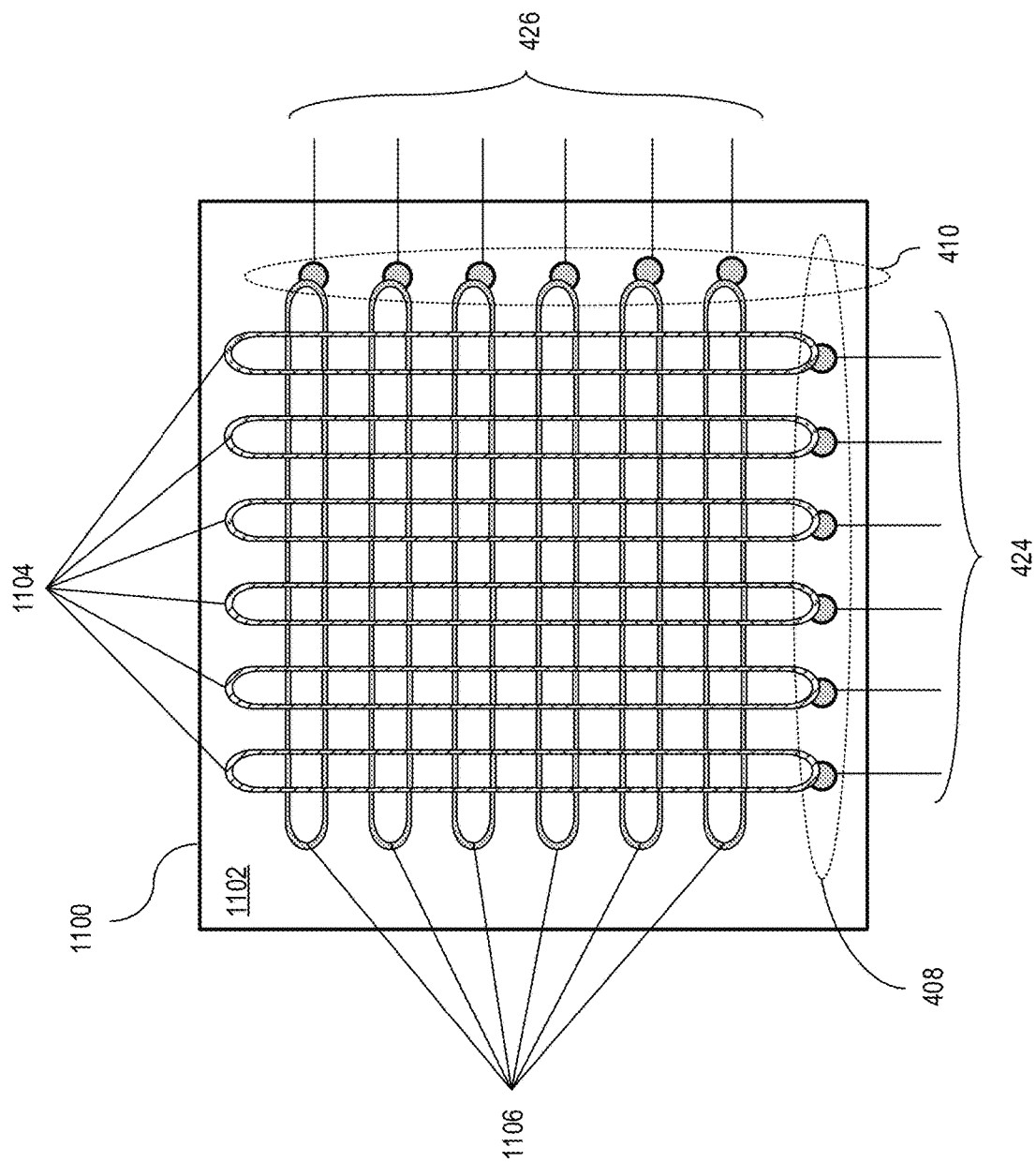

In FIGS. 11A-C, front views of a system diagram of an example of yet another implementation of oscillating heat pipes on a middle plate 1100 for use with the is shown in accordance with the present disclosure. As before, the middle plate 1100 includes a front surface 1102. However, in this example, the first plurality of oscillating heat pipes 1104 and second plurality of oscillating heat pipes 1106 consist of a plurality of discrete oscillating heat pipes, where the first plurality of oscillating heat pipes 1104 and a second plurality of oscillating heat pipes 1106 that are oriented approximately orthogonal to the first plurality of oscillating heat pipes 1104. The first plurality of oscillating heat pipes 1104 are shown in FIG. 11A as discrete oscillating heat pipes oriented as columns and the second plurality of oscillating heat pipes 1106 are shown in FIG. 11B as discrete oscillating heat pipes oriented as rows. In this example, the discrete oscillating heat pipes are channels. In FIG. 11C, the rows and columns of the discrete channels of the first plurality of oscillating heat pipes 1104 and the second plurality of oscillating heat pipes 1106 are shown on the front surface 1102 of the middle plate 1100.

Unlike the previous examples, in this example the plurality of column probes 408 are shown to be in physical contact and thermal communication with the bends of each of the discrete oscillating heat pipes of the first plurality of oscillating heat pipes 1104 and the plurality of row probes 410 are shown to be in physical contact and thermal communication with the bends of each of the discrete oscillating heat pipes of the second plurality of oscillating heat pipes 1106. In this example, each of the oscillating heat pipes of the first plurality of oscillating heat pipes 1004 are arranged as columns on the front surface 1102 of the middle plate 1100 and the each of the oscillating heat pipes of the second plurality of oscillating heat pipes 1106 are arranged as rows on the front surface 1102 of the middle plate 1100. In this example, second plurality of oscillating heat pipes 1106 are shown as located on the front surface 1102 of the middle plate 1100 below the first plurality of oscillating heat pipes 1104. However, it is appreciated that the arrangement optionally may be reversed such that the first plurality of oscillating heat pipes 1104 are located on the front surface 1102 of the middle plate 1100 below the second plurality of oscillating heat pipes 1106. Moreover, the first plurality of oscillating heat pipes 1104 and second plurality of oscillating heat pipes 1106 may be interleaved on the front surface 1102 of the middle plate 1100.

From these examples, it is appreciated that the EPC 100, 400 may be configured in different ways. As an example, regarding the examples described in relation to FIGS. 2 and 3, the first plurality of oscillating heat pipes 108 may be configured as discrete oscillating heat pipes similar to the first plurality of oscillating heat pipes 1104 shown and described in relation to FIG. 11A. Moreover, the second plurality of oscillating heat pipes 1106 may be configured as discrete oscillating heat pipes similar to the second plurality of oscillating heat pipes 1106 shown and described in relation to FIG. 11B.

Figure 4:
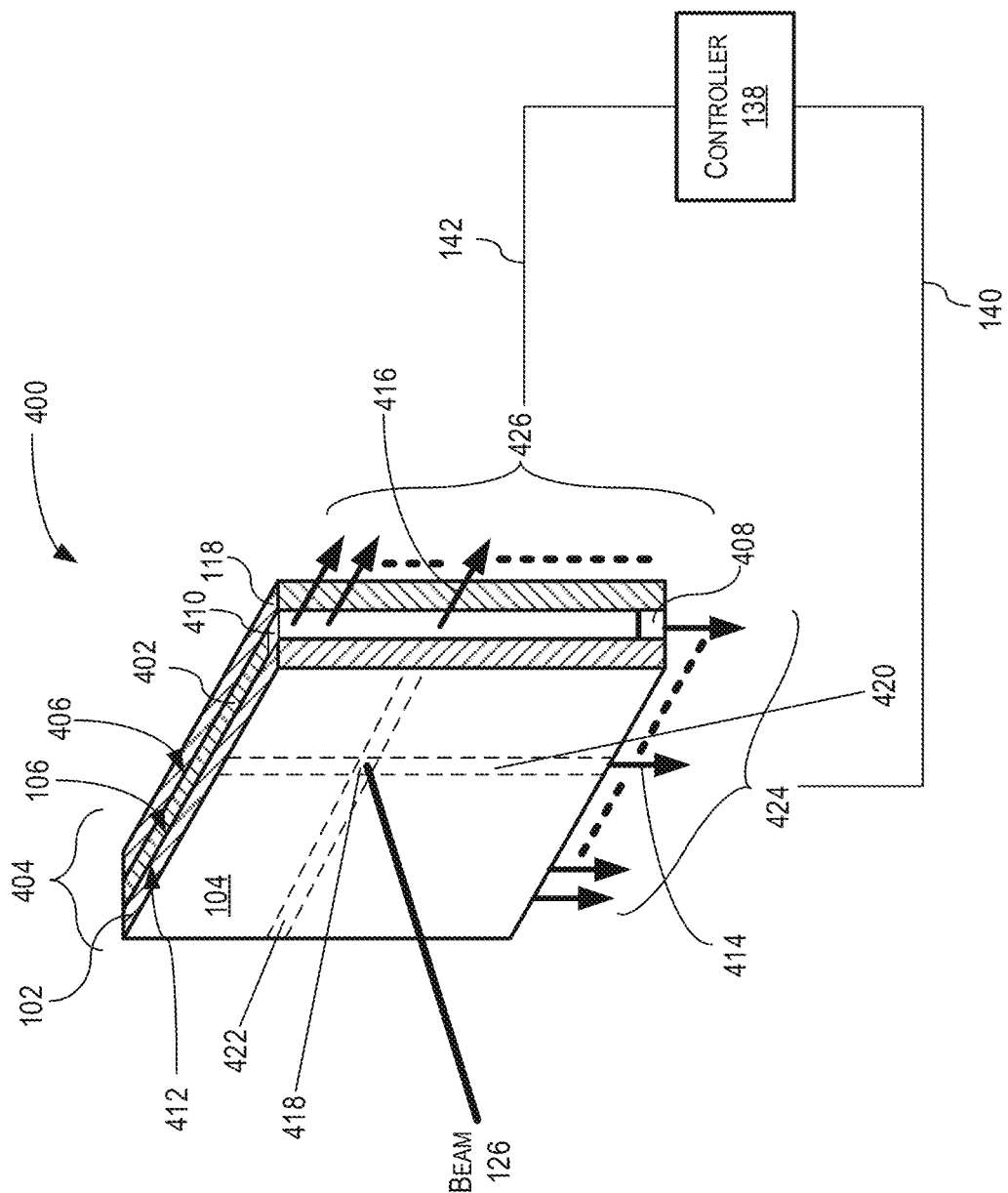
FIG. 4 is a perspective view of an example of an implementation of another EPC having a middle plate in accordance with the present disclosure.

Furthermore, with regard to the examples shown in relation to FIGS. 4, 8, and 11C, the first plurality of oscillating heat pipes and second plurality of oscillating heat pipes may be part of a single closed multiple loop oscillating heat pipe.

In all of these examples, the EPC 100, 400 may be manufactured utilizing three-dimensional additive manufacturing techniques.

Figure 12:
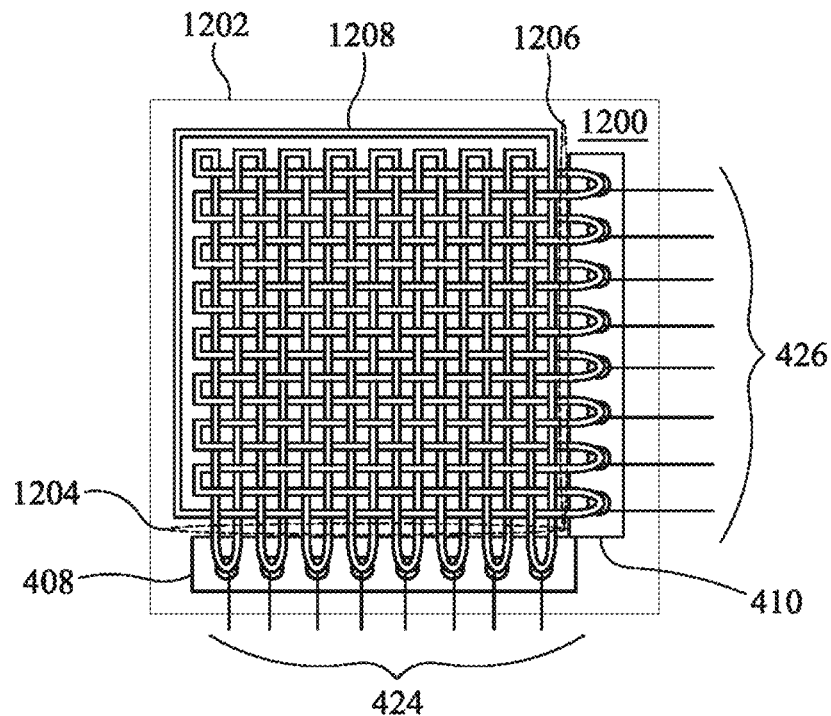
FIG. 12 is a front view of a system diagram of an example of yet another implementation of oscillating heat pipes on a middle plate for use with the EPC of FIG. 4 in accordance with the present disclosure.

Turning to FIG. 12, a front view of a system diagram of an example of yet another implementation of the oscillating heat pipes on the front surface 1200 of the middle plate 1202 for use with the EPC 400 in accordance with the present disclosure. In this example, the first plurality of oscillating heat pipes 1204 and second plurality of oscillating heat pipes 1206 are shown as being part of a single multiple loop oscillating heat pipe 1208. Similar to the examples shown in relation to FIGS. 8 and 10, in this example, the single multiple loop oscillating heat pipe 1208 includes the first plurality of oscillating heat pipes 1204 and the second plurality of oscillating heat pipes 1206 are oriented approximately orthogonal to each other.

Additionally, the plurality of column probes 408 are shown to be in physical contact and thermal communication with serpentine bends of each of the oscillating heat pipes of the first plurality of oscillating heat pipes 1204 and the plurality of row probes 410 are shown to be in physical contact and thermal communication with serpentine bends of each of the oscillating heat pipes of the second plurality of oscillating heat pipes 1206. In this example, each of the oscillating heat pipes of the first plurality of oscillating heat pipes 1204 are arranged as columns on the front surface 1200 of the middle plate 1202 and the each of the oscillating heat pipes of the second plurality of oscillating heat pipes 1206 are arranged as rows on the front surface 1200 of the middle plate 1202. Moreover, in this example, the first plurality of oscillating heat pipes 1204 and a second plurality of oscillating heat pipes 1206 are interleaved on the front surface 1200 of the middle plate 1202.

Figure 13A:
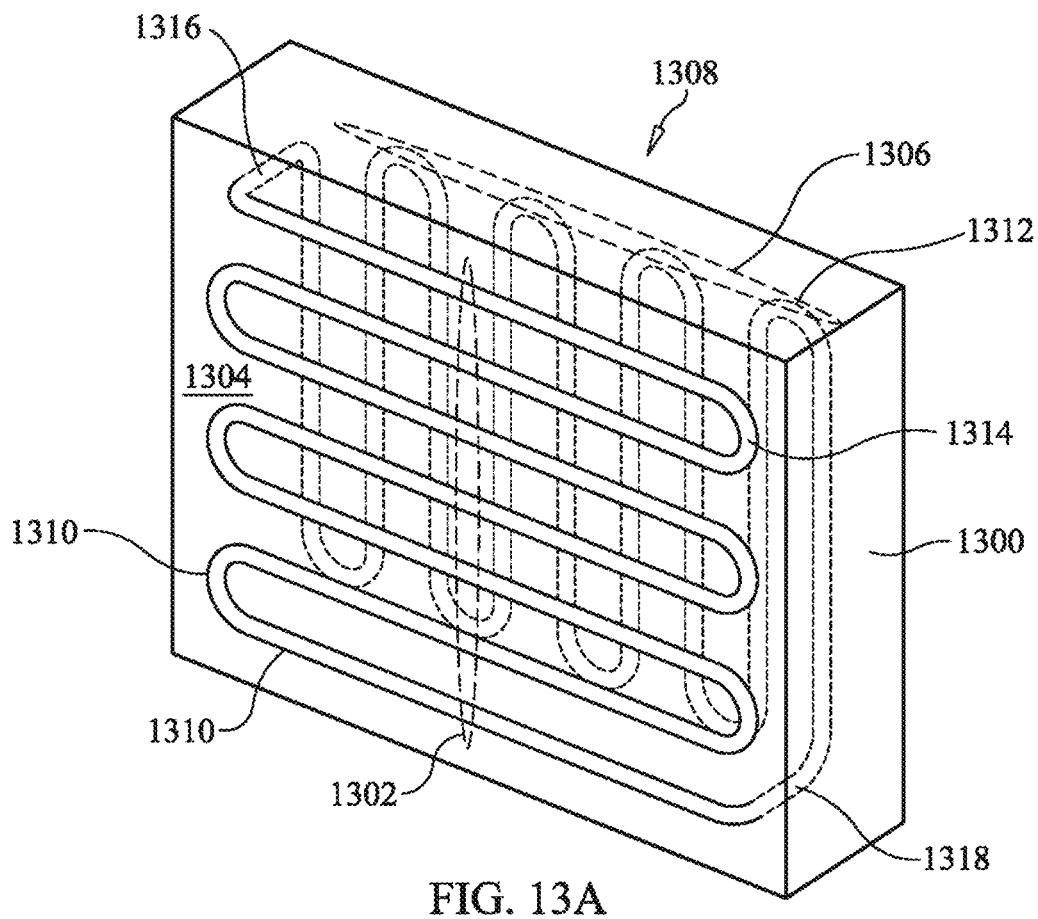
FIG. 13A is a front perspective view of a system diagram of an example of still another implementation of the oscillating heat pipes on a middle plate for use with the EPC of FIG. 4 in accordance with the present disclosure.
Figure 13B:
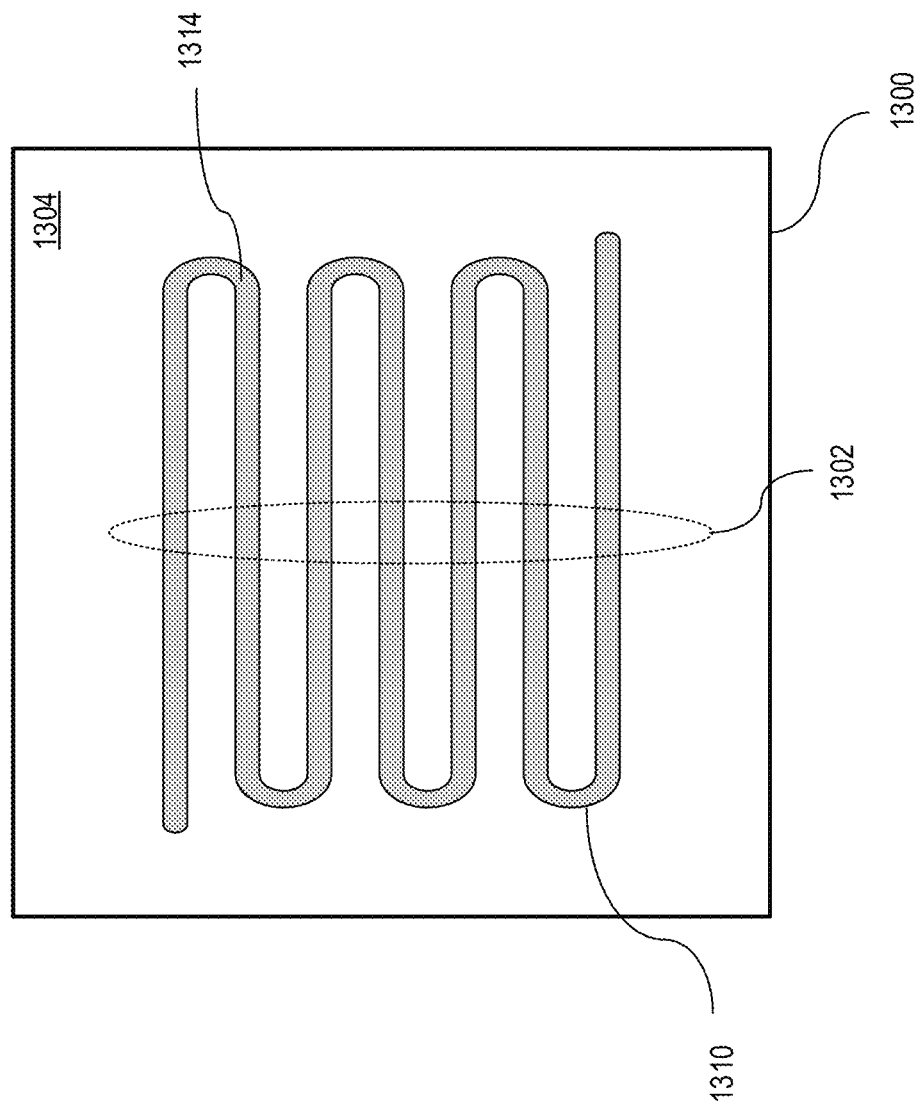
FIG. 13B is a front view of the implementation of the first plurality of oscillating heat pipes on the middle plate shown in FIG. 13A in accordance with the present disclosure.
Figure 13C:
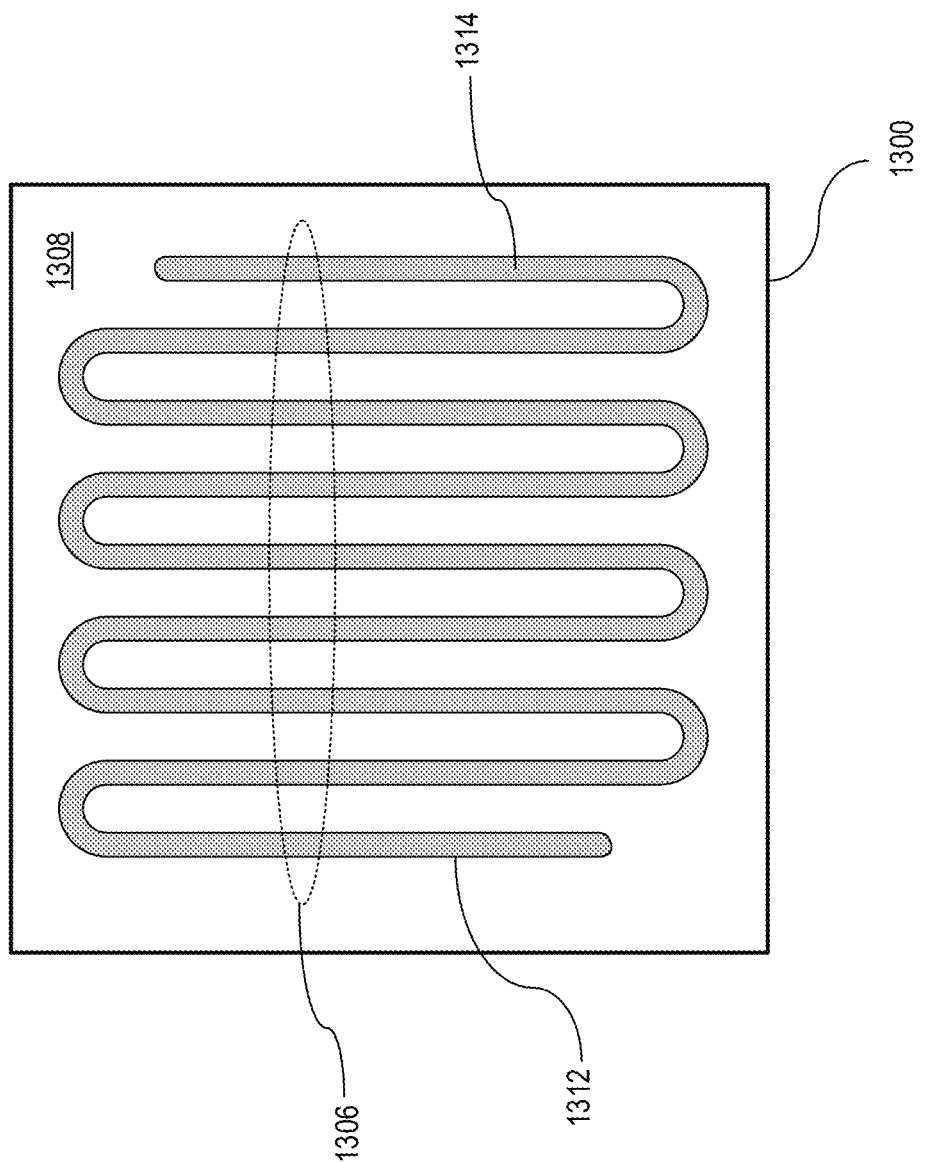
FIG. 13C is a back view of the implementation of the second plurality of oscillating heat pipes on the middle plate shown in FIG. 13A in accordance with the present disclosure.

In FIG. 13A, a front perspective view of a system diagram of an example of still another implementation of the oscillating heat pipes on the middle plate 1300 for use with the EPC 400 is shown in accordance with the present disclosure. FIG. 13B is a front view of the implementation of the first plurality of oscillating heat pipes 1302 on the front surface 1304 of the middle plate 1300 and FIG. 13C is a back view of the implementation of the second plurality of oscillating heat pipes 1306 on the middle plate 1300 in accordance with the present disclosure. In this example, the first plurality of oscillating heat pipes 1302 is arranged as rows on a front surface 1304 of the middle plate 1300 and the second plurality of oscillating heat pipes 1306 is arranged as columns on a back surface 1308 of the middle plate 1300. Additionally, in this example, the first plurality of oscillating heat pipes 1302 is part of a first multiple loop oscillating heat pipe 1310 and the second plurality of oscillating heat pipes 1306 is part of a second multiple loop oscillating heat pipe 1312. Moreover, the first multiple loop oscillating heat pipe 1310 and the second multiple loop oscillating heat pipe 1312 are part of a single multiple loop oscillating heat pipe 1314.

The single multiple loop oscillating heat pipe 1314 includes a first inter-surface tube connection 1316 and a second inter-surface tube connection 1318. In this example, the first inter-surface tube connection 1316 and second inter-surface tube connection 1318 are tubes that fluidly connect the first multiple loop oscillating heat pipe 1310 on the front surface 1304 to the second multiple loop oscillating heat pipe 1312 on the back surface 1308 of the middle plate 1300.

Alternatively, the first plurality of oscillating heat pipes 1302 may be arranged as columns on the front surface 1304 of the middle plate 1300 and the second plurality of oscillating heat pipes 1306 may be arranged as rows on the back surface 1308 of the middle plate 1300. Moreover, as another alternative, the first plurality of oscillating heat pipes 1302 may be arranged as columns on the back surface 1308 of the middle plate 1300 and the second plurality of oscillating heat pipes 1306 may be arranged as rows on the front surface 1304 of the middle plate 1300.

Figure 14:
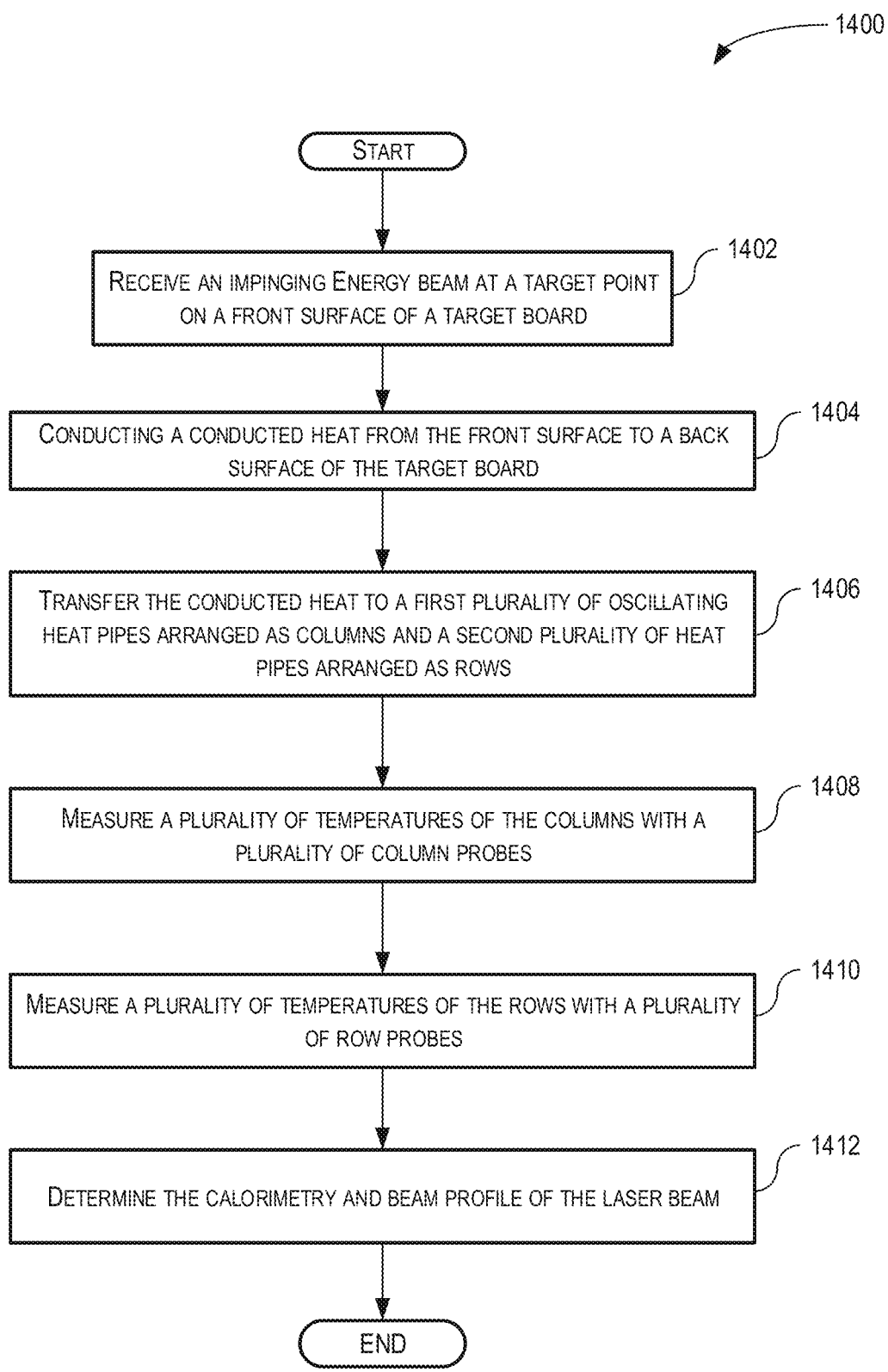
FIG. 14 is a flowchart of an example of an implementation of method performed by the EPC shown in FIGS. 1 and 4 in accordance with the present disclosure.

FIG. 14 is a flowchart of an example of an implementation of method performed by the EPC shown in FIGS. 1 and 4 in accordance with the present disclosure. In this example, the method 1400 starts by receiving 1402 an impinging energy beam 126 at the target point 304, 418 on the front surface 104 of the target board 102 which produces heat at the target point 304, 418. In response, conducting 1404 the heat from the received energy beam at the target point 304, 418 as conducted heat 116 through the target board 102 to the back surface 106 of the target board 102. The method 1400 then transfers 1406 the conducted heat 116 to the first plurality of oscillating heat pipes 108, 800 and the second plurality of oscillating heat pipes 112, 802, where the first plurality of oscillating heat pipes 108, 800 are arranged as columns and the second plurality of oscillating heat pipes 112, 802 are arranged as rows. The method 1400 then measures 1408, 1410 a plurality of temperatures of the columns with the plurality of column probes 122, 408 and a plurality of temperatures of the rows with the plurality of row probes 124, 410. The method 1400 then determines 1412 the calorimetry and beam profile of the energy beam 126 and the method 1400 ends.

It will be understood that various aspects or details of the disclosure may be changed without departing from the scope of the disclosure. It is not exhaustive and does not limit the claimed disclosures to the precise form disclosed. Furthermore, the foregoing description is for the purpose of illustration only, and not for the purpose of limitation. Modifications and variations are possible in light of the above description or may be acquired from practicing the disclosure. The claims and their equivalents define the scope of the disclosure. Moreover, although the techniques have been described in language specific to structural features and/or methodological acts, it is to be understood that the appended claims are not necessarily limited to the features or acts described. Rather, the features and acts are described as example implementations of such techniques.

Further, the disclosure comprises embodiments according to the following clauses.

Clause 1. An energy beam profiler and calorimeter (EPC) 100 comprising: a target board 102 having a front surface 104 and a back surface 106, wherein the target board 102 is configured to receive an impinging energy beam 126 at the front surface 104 of the target board 102; a first plurality of oscillating heat pipes 108 arranged as columns on a first plate 110; and a second plurality of oscillating heat pipes 112 arranged as rows on a second plate 114, wherein the first plate 110 and second plate 114 are adjacent to and in thermal communication with the back surface 106 of the target board 102.

Clause 2. The EPC 100 of claim 1, further comprising a plurality of column probes 122 in thermal communication with the first plurality of oscillating heat pipes 108 and a plurality of row probes 124 in thermal communication with the second plurality of oscillating heat pipes 112.

Clause 3. The EPC 100 of clauses 1 or 2, wherein the first plurality of oscillating heat pipes 108 is equal to a first quantity of oscillating heat pipes, the plurality of column probes 122 is equal to a second quantity of column probes, and the second quantity is less than the first quantity.

Clause 4. The EPC 100 of clauses 1, 2 or 3, wherein the first plurality of oscillating heat pipes 108 are arranged as columns on a front surface 200 of the first plate 110 and the second plurality of oscillating heat pipes 112 are arranged as rows on a front surface 204 of the second plate 114.

Clause 5. The EPC 100 of clauses 1, 2, 3, or 4 wherein each oscillating heat pipe of the first plurality of oscillating heat pipes 108 is a column channel and each column probe of the plurality of column probes 122 is a column temperature probe configured to measure a temperature of the column channel, and wherein each oscillating heat pipe of the second plurality of oscillating heat pipes 112 is a row channel and each row probe of the plurality of row probes 124 is a row temperature probe configured to measure a temperature of the row channel.

Clause 6. The EPC 100 of clauses 1, 2, 3, 4, or 5 further including a rear plate 118 adjacent to the first plate 110 and the second plate 114.

Clause 7. The EPC 100 of clauses 1, 2, 3, 4, 5, or 6, wherein the first plate 110 is adjacent to and in physical contact with the back surface 106 of the target board 102, the second plate 114 is adjacent to and in physical contact with a back surface 202 of first plate 110, and the rear plate 118 has a front surface 206 that is adjacent to and in physical contact with the second plate 114.

Clause 8. The EPC 100 of clauses 1, 2, 3, 4, 5, or 6, wherein the second plate 114 is adjacent to and in physical contact with the back surface 106 of target board 102, the first plate 110 is adjacent to and in physical contact with a back surface 202 of the second plate 114, and the rear plate 118 has a front surface 206 that is adjacent to and in physical contact with the first plate 110.

Clause 9. The EPC 100 of clauses 1, 2, 3, 4, 5, 6, 7, or 8, wherein the first plurality of oscillating heat pipes 108 is a plurality of discrete oscillating heat pipes arranged as columns on the front surface 200 of the first plate 110 and the second plurality of oscillating heat pipes 112 is a plurality of discrete oscillating heat pipes oriented as rows on the front surface 204 of the second plate 114.

Clause 10. The EPC 100 of clauses 1, 2, 3, 4, 5, 6, 7, or 8, wherein the first plurality of oscillating heat pipes 108 are part of a first multiple loop oscillating heat pipe 700 and the second plurality of oscillating heat pipes 112 are part of a second multiple loop oscillating heat pipe 702.

Clause 11. The EPC 100 of clauses 1, 2, 3, 4, 5, 6, 7, 8, 9, or 10, wherein the rows of the second plurality of oscillating heat pipes 112 are approximately orthogonal to the columns of the first plurality of oscillating heat pipes 108.

Clause 12. An energy beam profiler and calorimeter (EPC) 400 comprising: a target board 102 having a front surface 104 and a back surface 106, wherein the target board 102 is configured to receive an impinging energy beam 126 at the front surface 104 of the target board 102; a first plurality of oscillating heat pipes 800, 1004, 1104, 1204 arranged as columns on a middle plate 402; and a second plurality of oscillating heat pipes 802, 1006, 1106, 1206 arranged as rows on the middle plate 402, wherein the middle plate 402, 1000, 1100, 1202 is adjacent to and in thermal communication with the back surface 106 of the target board 102.

Clause 13. The EPC 400 of clause 12, further comprising a plurality of column probes 408 in thermal communication with the first plurality of oscillating heat pipes 800 and a plurality of row probes 410 in thermal communication with the second plurality of oscillating heat pipes 802.

Clause 14. The EPC 400 of clauses 12 or 13, wherein the first plurality of oscillating heat pipes 800 is equal to a first quantity of oscillating heat pipes, the plurality of column probes 408 is equal to a second quantity of column probes, and the second quantity is less than the first quantity.

Clause 15. The EPC 400 of clauses 12, 13, or 14, wherein the first plurality of oscillating heat pipes 800 are arranged as columns on a front surface 412 of the middle plate 402 and the second plurality of oscillating heat pipes 802 are arranged as rows on the front surface 412 of the middle plate 402 above or below the first plurality of oscillating heat pipes 800.

Clause 16. The EPC 400 of clauses 12, 13, 14 or 15, wherein the first plurality of oscillating heat pipes 800 are part of a first multiple loop oscillating heat pipe 804 and the second plurality of oscillating heat pipes 802 are part of a second multiple loop oscillating heat pipe 806.

Clause 17. The EPC 400 of clauses 12, 13, 14, 15, or 16, wherein the first plurality of oscillating heat pipes 1004 are arranged as columns on the front surface 1002 of the middle plate 1000, the second plurality of oscillating heat pipes 1006 are arranged as rows on the front surface 1002 of the middle plate 1000, and the first plurality of oscillating heat pipes 1004 and the second plurality of oscillating heat pipes 1006 are interleaved along the front surface 1002 of the middle plate 1000.

Clause 18. The EPC 400 of clauses 12, 13, 14, 15, 16, or 17, wherein the first plurality of oscillating heat pipes 1004 are part of a first multiple loop oscillating heat pipe 1008 and the second plurality of oscillating heat pipes 1006 are part of a second multiple loop oscillating heat pipe 1010.

Clause 19. The EPC 400 of clauses 12, 13, 14, 15, or 17, wherein the first plurality of oscillating heat pipes 1204 and the second plurality of oscillating heat pipes 1206 are part of a single multiple loop oscillating heat pipe 1208.

Clause 20. The EPC 400 of clauses 12, 13, 14, 15, 16, 17, 18, and 19, wherein each oscillating heat pipe of the first plurality of oscillating heat pipes 800 is a column channel and each column probe of the plurality of column probes 408 is a column temperature probe configured to measure a temperature of the column channel, and wherein each oscillating heat pipe of the second plurality of oscillating heat pipes 802 is a row channel and each row probe of the plurality of row probes 410 is a row temperature probe configured to measure a temperature of the row channel.

Clause 21. The EPC 400 of clauses 12, 13, 14, 15, or 20, wherein the first plurality of oscillating heat pipes 1104 is a plurality of discrete oscillating heat pipes arranged as columns on the front surface 1102 of the middle plate 1100 and the second plurality of oscillating heat pipes 1106 is a plurality of discrete oscillating heat pipes oriented as rows on the front surface 1102 of the middle plate 1100.

Clause 22. The EPC 400 of clauses 12, 13, 14, 15, 20, or 21, wherein the first plurality of oscillating heat pipes 1104 and the second plurality of oscillating heat pipes 1106 are interleaved along the front surface 1102 of the middle plate 1100.

Clause 23. The EPC 400 of clause 12, wherein the first plurality of oscillating heat pipes 1302 is arranged as columns on a front surface 1304 of the middle plate 1300 and the second plurality of oscillating heat pipes 1306 is arranged as rows on a back surface 1308 of the middle plate 1300.

Clause 24. The EPC 400 of clause 12, wherein the first plurality of oscillating heat pipes 1302 is arranged as columns on a back surface 1308 of the middle plate 1300 and the second plurality of oscillating heat pipes 1306 is arranged as rows on a front surface 1304 of the middle plate 1300.

Clause 25. The EPC 400 of clause 23 or 24, wherein the first plurality of oscillating heat pipes 1302 are part of a first multiple loop oscillating heat pipe 1310 and the second plurality of oscillating heat pipes 1306 are part of a second multiple loop oscillating heat pipe 1312.

Clause 26. The EPC 400 of clause 12, wherein the first plurality of oscillating heat pipes 1302 and the second plurality of oscillating heat pipes 1306 are part of a single multiple loop oscillating heat pipe 1314.

Clause 27. The EPC 400 of clause 12, wherein the rows of the second plurality of oscillating heat pipes 802 are approximately orthogonal to the columns of the first plurality of oscillating heat pipes 800.

Clause 28. The EPC 400 of clause 25, further including a rear plate 118 adjacent to a back surface 406 of the middle plate 402.

Clause 29. A method 1400 for measuring a calorimetry and beam profile of an energy beam with an energy beam profiler and calorimeter (EPC) 100, 400, the method 1400 comprising: receiving 1402 an impinging energy beam 126 at a target point 304, 418 of a front surface 104 of a target board 102, wherein the impinging energy beam 126 produces heat at the front surface 104 at the target point 304, 418; conducting 1404, as a conducted heat 116, the heat at the target point 304, 418 from the front surface 104 to a back surface 106 of the target board 102; transferring 1406 the conducted heat 116 to a first plurality of oscillating heat pipes 108, 800 arranged as columns and a second plurality of oscillating heat pipes 112, 802 arranged as rows; measuring 1408 a plurality of temperatures of the columns with a plurality of column probes 122, 408; measuring 1410 a plurality of temperatures of the rows with a plurality of row probes 124, 410; and determining 1412 the calorimetry and beam profile of the energy beam 126.

Clause 30. The method 1400 of clause 29, wherein the transferring 1406 the conducted heat 116 to the second plurality of oscillating heat pipes 112, 802 includes transferring 1406 the conducted heat 116 to the second plurality of oscillating heat pipes 112, 802 that includes rows that are approximately orthogonal to the columns of the first plurality of oscillating heat pipes 108, 800.

Clause 31. The method 1400 of clause 30, wherein each oscillating heat pipe of the first plurality of oscillating heat pipes 108 is a column channel and each column probe of the plurality of column probes 122 is a column temperature probe configured to measure a temperature of the column channel, and wherein each oscillating heat pipe of the second plurality of oscillating heat pipes 112 is a row channel and each row probe of the plurality of row probes 124 is a row temperature probe configured to measure a temperature of the row channel.

Clause 32. The method 1400 of clauses 30 or 31, wherein the first plurality of oscillating heat pipes 108 are arranged as columns on a front surface 200 of a first plate 110 and the second plurality of oscillating heat pipes 112 are arranged as rows on a front surface 204 of a second plate 114, wherein the first plate 110 is adjacent to and in physical contact with the back surface 106 of the target board 102, the second plate 114 is adjacent to and in physical contact with a back surface 202 of first plate 110, and a rear plate 118 has a front surface 206 that is adjacent to and in physical contact with the second plate 114, or wherein the second plate 114 is adjacent to and in physical contact with the back surface 106 of target board 102, the first plate 110 is adjacent to and in physical contact with a back surface 202 of the second plate 114, and the front surface 206 of the rear plate 118 is adjacent to and in physical contact with the first plate 110.

Clause 33. The method 1400 of clauses 30, 31, or 32, wherein the first plurality of oscillating heat pipes 800 are arranged as columns on a front surface 412 of the middle plate 402 and the second plurality of oscillating heat pipes 802 are arranged as rows on the front surface 412 of the middle plate 402 either below or above the first plurality of oscillating heat pipes 800.

To the extent that terms "includes," "including," "has," "contains," and variants thereof are used herein, such terms are intended to be inclusive in a manner similar to the term "comprises" as an open transition word without precluding any additional or other elements. Moreover, conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

What is claimed:

1. An energy beam profiler and calorimeter (EPC) comprising:
    a target board having a front surface and a back surface, wherein the target board is configured to receive an impinging energy beam at the front surface of the target board;
    a first plurality of oscillating heat pipes arranged as columns on a first plate;
    a second plurality of oscillating heat pipes arranged as rows on a second plate;
    a plurality of column probes in thermal communication with the first plurality of oscillating heat pipes and
    a plurality of row probes in thermal communication with the second plurality of oscillating heat pipes,
    wherein the first plate and second plate are adjacent to and in thermal communication with the back surface of the target board.

2. The EPC of claim 1,
    wherein
    the first plurality of oscillating heat pipes is equal to a first quantity of oscillating heat pipes,
    the plurality of column probes is equal to a second quantity of column probes, and
    the second quantity is less than the first quantity, and wherein
    the first plurality of oscillating heat pipes are arranged as columns on a front surface of the first plate and
    the second plurality of oscillating heat pipes are arranged as rows on a front surface of the second plate.

3. The EPC of claim 2,
    wherein each oscillating heat pipe of the first plurality of oscillating heat pipes is a column channel and each column probe of the plurality of column probes is a column temperature probe configured to measure a temperature of the column channel, and
    wherein each oscillating heat pipe of the second plurality of oscillating heat pipes is a row channel and each row probe of the plurality of row probes is a row temperature probe configured to measure a temperature of the row channel.

4. The EPC of claim 2, further including a rear plate adjacent to the first plate and the second plate,
    wherein
    the first plate is adjacent to and in physical contact with the back surface of the target board,
    the second plate is adjacent to and in physical contact with a back surface of first plate, and
    the rear plate has a front surface that is adjacent to and in physical contact with the second plate,
    wherein
    the second plate is adjacent to and in physical contact with the back surface of target board,
    the first plate is adjacent to and in physical contact with a back surface of the second plate, and
    the rear plate has a front surface that is adjacent to and in physical contact with the first plate.

5. The EPC of claim 1, wherein
    the first plurality of oscillating heat pipes is a plurality of discrete oscillating heat pipes arranged as columns on the front surface of the first plate and
    the second plurality of oscillating heat pipes is a plurality of discrete oscillating heat pipes oriented as rows on the front surface of the second plate.

6. The EPC of claim 1, wherein
    the first plurality of oscillating heat pipes are part of a first multiple loop oscillating heat pipe and
    the second plurality of oscillating heat pipes are part of a second multiple loop oscillating heat pipe.

7. An energy beam profiler and calorimeter (EPC) comprising:
    a target board having a front surface and a back surface, wherein the target board is configured to receive an impinging energy beam at the front surface of the target board;
    a first plurality of oscillating heat pipes arranged as columns on a middle plate;
    a second plurality of oscillating heat pipes arranged as rows on the middle plate;
    a plurality of column probes in thermal communication with the first plurality of oscillating heat pipes and
    a plurality of row probes in thermal communication with the second plurality of oscillating heat pipes,
    wherein the middle plate is adjacent to and in thermal communication with the back surface of the target board.

8. The EPC of claim 7, wherein
    the first plurality of oscillating heat pipes is equal to a first quantity of oscillating heat pipes,
    the plurality of column probes is equal to a second quantity of column probes, and
    the second quantity is less than the first quantity.

9. The EPC of claim 7, wherein
    the first plurality of oscillating heat pipes are arranged as columns on a front surface of the middle plate and the second plurality of oscillating heat pipes are arranged as rows on the front surface of the middle plate above or below the first plurality of oscillating heat pipes.

10. The EPC of claim 8 or 9, wherein
the first plurality of oscillating heat pipes are part of a first multiple loop oscillating heat pipe and
the second plurality of oscillating heat pipes are part of a second multiple loop oscillating heat pipe.

11. The EPC of claim 7, wherein
the first plurality of oscillating heat pipes are arranged as columns on the front surface of the middle plate,
the second plurality of oscillating heat pipes are arranged as rows on the front surface of the middle plate, and
the first plurality of oscillating heat pipes and the second plurality of oscillating heat pipes are interleaved along the front surface of the middle plate.

12. The EPC of claim 11, wherein
the first plurality of oscillating heat pipes are part of a first multiple loop oscillating heat pipe and
the second plurality of oscillating heat pipes are part of a second multiple loop oscillating heat pipe.

13. The EPC of claim 11, wherein the first plurality of oscillating heat pipes and the second plurality of oscillating heat pipes are part of a single multiple loop oscillating heat pipe.

14. The EPC of claim 7,
wherein each oscillating heat pipe of the first plurality of oscillating heat pipes is a column channel and each column probe of the plurality of column probes is a column temperature probe configured to measure a temperature of the column channel, and
wherein each oscillating heat pipe of the second plurality of oscillating heat pipes is a row channel and each row probe of the plurality of row probes is a row temperature probe configured to measure a temperature of the row channel.

15. The EPC of claim 7, wherein
the first plurality of oscillating heat pipes is a plurality of discrete oscillating heat pipes arranged as columns on the front surface of the middle plate and
the second plurality of oscillating heat pipes is a plurality of discrete oscillating heat pipes oriented as rows on the front surface of the middle plate.

16. The EPC of claim 15, wherein the first plurality of oscillating heat pipes and the second plurality of oscillating heat pipes are interleaved along the front surface of the middle plate.

17. The EPC of claim 7,
wherein
the first plurality of oscillating heat pipes is arranged as columns on a front surface of the middle plate and
the second plurality of oscillating heat pipes is arranged as rows on a back surface of the middle plate, or
wherein
the first plurality of oscillating heat pipes is arranged as columns on the back surface of the middle plate and
the second plurality of oscillating heat pipes is arranged as rows on the front surface of the middle plate.

18. The EPC of claim 17, wherein
the first plurality of oscillating heat pipes are part of a first multiple loop oscillating heat pipe and
the second plurality of oscillating heat pipes are part of a second multiple loop oscillating heat pipe.

19. The EPC of claim 18, wherein the first plurality of oscillating heat pipes and the second plurality of oscillating heat pipes are part of a single multiple loop oscillating heat pipe.

20. A method for measuring a calorimetry and beam profile of an energy beam with an energy beam profiler and calorimeter (EPC), the method comprising:
receiving an impinging energy beam at a target point of a front surface of a target board, wherein the impinging energy beam produces heat at the front surface at the target point;
conducting, as a conducted heat, the heat at the target point from the front surface to a back surface of the target board;
transferring the conducted heat to a first plurality of oscillating heat pipes arranged as columns and a second plurality of oscillating heat pipes arranged as rows;
measuring a plurality of temperatures of the columns with a plurality of column probes;
measuring a plurality of temperatures of the rows with a plurality of row probes; and
determining the calorimetry and beam profile of the energy beam.

21. The method of claim 20, wherein the
transferring the conducted heat to the second plurality of oscillating heat pipes includes transferring the conducted heat to the second plurality of oscillating heat pipes that includes rows that are approximately orthogonal to the columns of the first plurality of oscillating heat pipes.

22. The method of claim 21,
wherein each oscillating heat pipe of the first plurality of oscillating heat pipes is a column channel and each column probe of the plurality of column probes is a column temperature probe configured to measure a temperature of the column channel, and
wherein each oscillating heat pipe of the second plurality of oscillating heat pipes is a row channel and each row probe of the plurality of row probes is a row temperature probe configured to measure a temperature of the row channel.

23. The method of claim 21,
wherein
the first plurality of oscillating heat pipes are arranged as columns on a front surface of a first plate and
the second plurality of oscillating heat pipes are arranged as rows on a front surface of a second plate,
wherein
the first plate is adjacent to and in physical contact with the back surface of the target board,
the second plate is adjacent to and in physical contact with a back surface of first plate, and
a rear plate has a front surface that is adjacent to and in physical contact with the second plate, or
wherein
the second plate is adjacent to and in physical contact with the back surface of target board,
the first plate is adjacent to and in physical contact with a back surface of the second plate, and
the front surface of the rear plate is adjacent to and in physical contact with the first plate.

24. The method of claim 21, wherein
the first plurality of oscillating heat pipes are arranged as columns on a front surface of the middle plate and
the second plurality of oscillating heat pipes are arranged as rows on the front surface of the middle plate either below or above the first plurality of oscillating heat pipes.

* * * * *